US011908380B2

(12) United States Patent
Kim et al.

(10) Patent No.: US 11,908,380 B2
(45) Date of Patent: Feb. 20, 2024

(54) SCAN DRIVING CIRCUIT, DRIVING CONTROLLER AND DISPLAY DEVICE INCLUDING THEM

(71) Applicant: Samsung Display Co., Ltd., Yongin-si (KR)

(72) Inventors: Soon-Dong Kim, Osan-si (KR); Taehoon Kim, Hwaseong-si (KR); Jin-Wook Yang, Suwon-si (KR); Changnoh Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/956,111

(22) Filed: Sep. 29, 2022

(65) Prior Publication Data

US 2023/0215337 A1 Jul. 6, 2023

(30) Foreign Application Priority Data

Dec. 31, 2021 (KR) ........................ 10-2021-0193582

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0819* (2013.01); *G09G 2310/0267* (2013.01); *G09G 2310/0275* (2013.01); *G09G 2310/08* (2013.01); *G09G 2330/028* (2013.01)

(58) Field of Classification Search
None
See application file for complete search history.

(56) References Cited

U.S. PATENT DOCUMENTS 10,255,860 B2 4/2019 Na et al.
10,593,268 B2 3/2020 An et al.
2021/0407412 A1* 12/2021 Kim .................... G09G 3/3258

FOREIGN PATENT DOCUMENTS

KR 1020170081125 A 7/2017
KR 1020180055575 A 5/2018

* cited by examiner

*Primary Examiner* — Christopher J Kohlman
(74) *Attorney, Agent, or Firm* — CANTOR COLBURN LLP

(57) ABSTRACT

A display device includes a display panel including a first pixel connected to a first initialization scan line and a first compensation scan line and a second pixel connected to a second initialization scan line and a second compensation scan line, a scan driving circuit which provides a first initialization scan signal to the first initialization scan line and the second initialization scan line in common and provides a first compensation scan signal and a second compensation scan signal to the first compensation scan line and the second compensation scan line, and a driving controller which controls the scan driving circuit. A delay time from a time point at which the first initialization scan signal transitions from an active level to an inactive level to a time point at which the first compensation scan signal transitions from the inactive level to the active level is less than one horizontal period.

28 Claims, 18 Drawing Sheets

EMD11-EMD14: 310
GID11-GID14: 320
GCD11-GCD18: 330
GWD11-GWD18: 340

EMD21-EMD24: 410
GID21-GID24: 420
GCD21-GCD28: 430
GWD21-GWD28: 440

SCAN DRIVING CIRCUIT, DRIVING CONTROLLER AND DISPLAY DEVICE INCLUDING THEM

This application claims priority to Korean Patent Application No. 10-2021-0193582, filed on Dec. 31, 2021, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

A display device includes pixels connected to data lines and scan lines. In general, each of the pixels includes a light emitting element and a pixel circuit for controlling a current flowing to the light emitting element. In response to a data signal, the pixel circuit may control a current that flows from a terminal, to which a first driving voltage is applied, to a terminal, to which a second driving voltage is applied, via the light emitting element. At this time, light having predetermined luminance may be generated in response to a current flowing via the light emitting element.

SUMMARY

Embodiments of the disclosure provide a display device having the improved display quality.

According to an embodiment, a display device includes a display panel including a first pixel connected to a first initialization scan line and a first compensation scan line and a second pixel connected to a second initialization scan line and a second compensation scan line, a scan driving circuit which provides a first initialization scan signal to the first initialization scan line and the second initialization scan line in common and provides a first compensation scan signal and a second compensation scan signal to the first compensation scan line and the second compensation scan line, respectively, and a driving controller which controls the scan driving circuit. In such an embodiment, a delay time from a time point at which the first initialization scan signal transitions from an active level to an inactive level to a time point at which the first compensation scan signal transitions from the inactive level to the active level is less than one horizontal period.

In an embodiment, the one horizontal period may be a time period from a time point at which the first compensation scan signal transitions from the inactive level to the active level to a time point at which the second compensation scan signal transitions from the inactive level to the active level.

In an embodiment, the driving controller may provide the scan driving circuit with a first start signal, a second start signal, a first clock signal, a second clock signal, a third clock signal, and a fourth clock signal.

In an embodiment, the scan driving circuit may output the first initialization scan signal in response to the first start signal, the first clock signal, and the second clock signal, and the scan driving circuit may output the first compensation scan signal and the second compensation scan signal in response to the second start signal, the third clock signal, and the fourth clock signal.

In an embodiment, the scan driving circuit may include an initialization stage which outputs the first initialization scan signal in response to the first start signal, the first clock signal, and the second clock signal, a first compensation stage that outputs the first compensation scan signal in response to the second start signal, the third clock signal, and the fourth clock signal, and a second compensation stage which outputs the second compensation scan signal in response to the first compensation scan signal, the third clock signal, and the fourth clock signal.

In an embodiment, a frequency of each of the third clock signal and the fourth clock signal may be higher than a frequency of each of the first clock signal and the second clock signal.

In an embodiment, the display panel may further include a third pixel connected to a third initialization scan line and a third compensation scan line and a fourth pixel connected to a fourth initialization scan line and a fourth compensation scan line. In such an embodiment, the scan driving circuit may provide a second initialization scan signal to the third initialization scan line and the fourth initialization scan line in common and may further provide a third compensation scan signal and a fourth compensation scan signal to the third compensation scan line and the fourth compensation scan line, respectively.

In an embodiment, a delay time from a time point at which the first initialization scan signal transitions from the inactive level to the active level to a time point at which the second initialization scan signal transitions from the inactive level to the active level may be two horizontal periods.

In an embodiment, the display panel may further include a data line connected to the first pixel and the second pixel, and the display device may further include a data driving circuit which drives the data line.

In an embodiment, the driving controller may receive an input image signal, may compensate for the input image signal corresponding to at least one selected from the first pixel and the second pixel based on a compensation value, and may output an output image signal to the data driving circuit.

In an embodiment, the compensation value may include a first compensation value corresponding to the first pixel and a second compensation value corresponding to the second pixel. In such an embodiment, the driving controller may compensate for the input image signal corresponding to the first pixel based on the first compensation value and may output the output image signal to the data driving circuit. In such an embodiment, the driving controller may compensate for the input image signal corresponding to the second pixel based on the second compensation value and may output the output image signal to the data driving circuit.

According to an embodiment, a display device includes a display panel including a first pixel connected to a first initialization scan line and a first compensation scan line, a second pixel connected to a second initialization scan line and a second compensation scan line, a third pixel connected to a third initialization scan line and a third compensation scan line, and a fourth pixel connected to a fourth initialization scan line and a fourth compensation scan line, a scan driving circuit which provides a first initialization scan signal to the first initialization scan line and the second initialization scan line in common, provides a second initialization scan signal to the third initialization scan line and the fourth initialization scan line in common, and provides a first compensation scan signal, a second compensation scan signal, a third compensation scan signal, and a fourth compensation scan signal to the first compensation scan line, the second compensation scan line, the third compensation scan line, and the fourth compensation scan line, respectively, and a driving controller which controls the scan driving circuit. A first time from a time point at which the first compensation scan signal transitions from an inactive level to an active level to a time point at which the second compensation scan signal transitions from the inactive level to the active level may be less than a second time from a time point at which the second compensation scan signal transitions from the inactive level to the active level to a time point at which the third compensation scan signal transitions from the inactive level to the active level.

In an embodiment, a third time from a time point at which the third compensation scan signal transitions from the inactive level to the active level to a time point at which the fourth compensation scan signal transitions from the inactive level to the active level may be less than the second time.

In an embodiment, the second time may be one horizontal period, and each of the first time and the third time may be less than the one horizontal period.

In an embodiment, a delay time from a time point at which the first initialization scan signal transitions from the inactive level to the active level to a time point at which the second initialization scan signal transitions from the inactive level to the active level may be two horizontal periods.

In an embodiment, the driving controller may provide the scan driving circuit with a first start signal, a second start signal, a first clock signal, a second clock signal, a third clock signal, and a fourth clock signal.

In an embodiment, the scan driving circuit may output the first initialization scan signal and the second initialization scan signal in response to the first start signal, the first clock signal, and the second clock signal. In such an embodiment, the scan driving circuit may output the first compensation scan signal, the second compensation scan signal, the third compensation scan signal, and the fourth compensation scan signal in response to the second start signal, the third clock signal, and the fourth clock signal.

In an embodiment, the scan driving circuit may include a first initialization stage which outputs the first initialization scan signal in response to the first start signal, the first clock signal and the second clock signal and a second initialization stage which outputs the second initialization scan signal in response to the first initialization scan signal, the first clock signal, and the second clock signal.

In an embodiment, the scan driving circuit may include a first compensation stage which outputs the first compensation scan signal in response to the second start signal, the third clock signal, and the fourth clock signal, a second compensation stage which outputs the second compensation scan signal in response to the first compensation scan signal, the third clock signal, and the fourth clock signal, a third compensation stage which outputs the third compensation scan signal in response to the second compensation scan signal, the third clock signal, and the fourth clock signal, and a fourth compensation stage which outputs the fourth compensation scan signal in response to the third compensation scan signal, the third clock signal, and the fourth clock signal.

In an embodiment, a frequency of each of the third clock signal and the fourth clock signal may be higher than a frequency of each of the first clock signal and the second clock signal.

In an embodiment, the display panel may further include a data line connected to the first pixel and the second pixel, and the display device may further include a data driving circuit which drives the data line.

In an embodiment, the driving controller may receive an input image signal, may compensate for the input image signal corresponding to at least one selected from the first pixel and the second pixel based on a compensation value, and may output an output image signal to the data driving circuit.

In an embodiment, the compensation value may include a first compensation value corresponding to the first pixel and a second compensation value corresponding to the second pixel. In such an embodiment, the driving controller may compensate for the input image signal corresponding to the first pixel based on the first compensation value and may output the output image signal to the data driving circuit. In such an embodiment, the driving controller may compensate for the input image signal corresponding to the second pixel based on the second compensation value and may output the output image signal to the data driving circuit.

According to an embodiment, a scan driving circuit includes a first scan driving circuit which provides a first initialization scan signal to a first initialization scan line and a second initialization scan line and a second scan driving circuit which provides a first compensation scan signal to a first compensation scan line and provides a second compensation scan signal to a second compensation scan line. In such an embodiment, a delay time from a time point at which 1 the first initialization scan signal transitions from an active level to an inactive level to a time point at which the first compensation scan signal transitions from the inactive level to the active level is less than one horizontal period.

In an embodiment, the one horizontal period may be a time from a time point at which the first compensation scan signal transitions from the inactive level to the active level to a time point at which the second compensation scan signal transitions from the inactive level to the active level.

According to an embodiment, a driving controller includes an image processor which outputs an output image signal in response to an input image signal and a control signal and a control signal generator which outputs a data control signal and a scan control signal in response to the control signal. In such an embodiment, the image processor outputs the output image signal for compensating for the input image signal by using a first compensation value when the input image signal corresponds to a first row of pixels, and the image processor outputs the output image signal for compensating for the input image signal by using a second compensation value when the input image signal corresponds to a second row of pixels.

In an embodiment, the scan control signal may include a start signal. In such an embodiment, the control signal generator may adjust a pulse width of the start signal such that a delay time from a time point at which a first initialization scan signal provided to a first initialization scan line transitions from an active level to an inactive level to from a time point at which a first compensation scan signal provided to a first compensation scan line transitions from the inactive level to the active level is less than one horizontal period.

In an embodiment, the scan control signal may include a first clock signal and a second clock signal. In such an embodiment, the control signal generator may output the first clock signal and the second clock signal such that a delay time from a time point at which a first initialization scan signal provided to a first initialization scan line transitions from an active level to an inactive level to a time point at which a first compensation scan signal provided to a first compensation scan line transitions from the inactive level to the active level is less than one horizontal period.

BRIEF DESCRIPTION OF THE DRAWINGS

The above and other features of the disclosure will become apparent by describing in detail embodiments thereof with reference to the accompanying drawings, in which.

DETAILED DESCRIPTION

Figure 1:
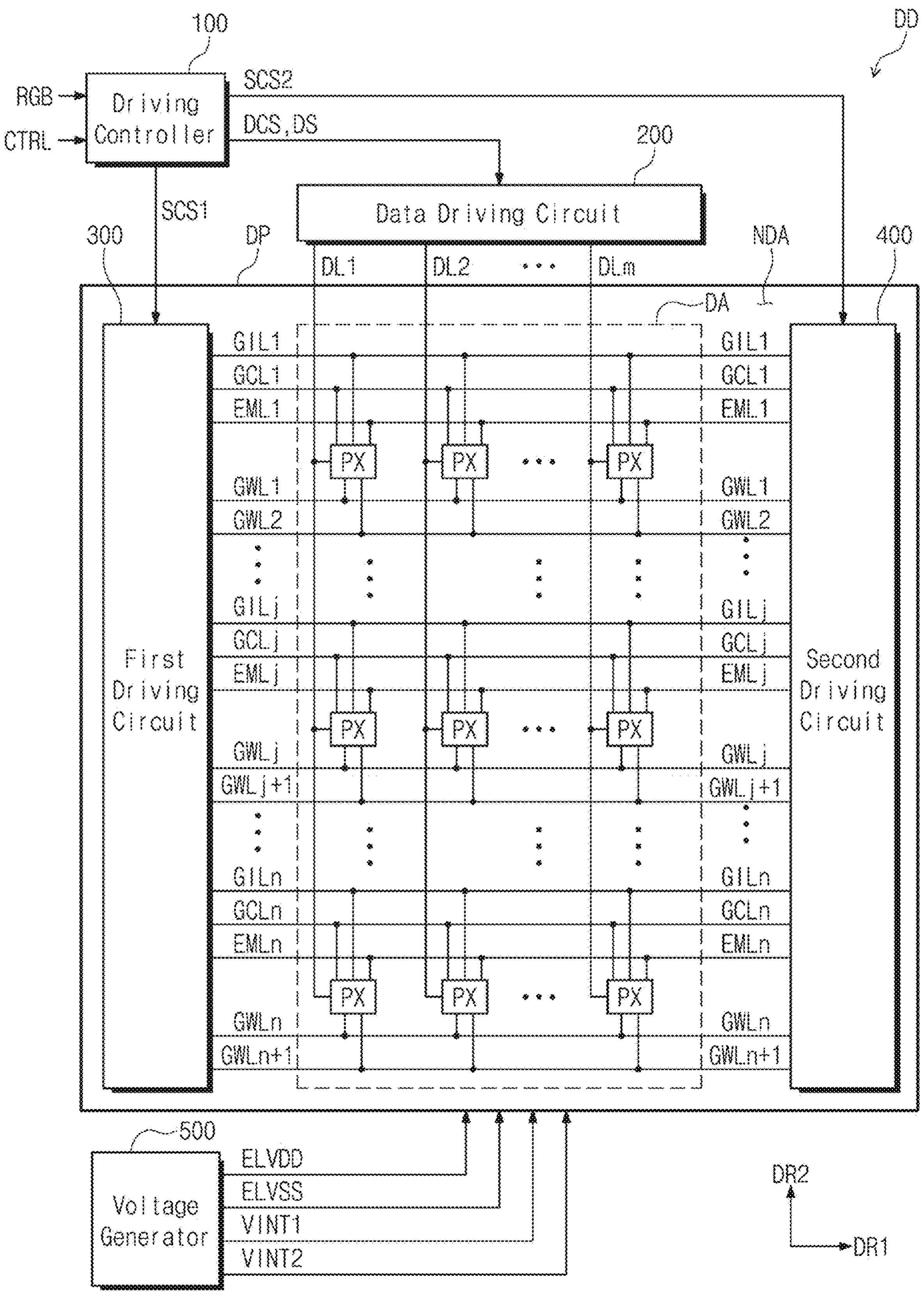
FIG. 1 is a block diagram of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. "Or" means "and/or." The term "and/or" includes one or more combinations of the associated listed items.

The terms "first", "second", etc. are used to describe various components, but the components are not limited by the terms. The terms are used only to differentiate one component from another component. For example, without departing from the scope and spirit of the disclosure, a first component may be referred to as a second component, and similarly, the second component may be referred to as the first component.

Also, the terms "under", "beneath", "on", "above", etc. are used to describe a relationship between components illustrated in a drawing. The terms are relative and are described with reference to a direction indicated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to accompanying drawings.

FIG. 1 is a block diagram of a display device, according to an embodiment of the disclosure.

Referring to FIG. 1, an embodiment of a display device DD includes a display panel DP, a driving controller 100, a data driving circuit 200, and a voltage generator 500. In an embodiment, the display device DD may be a portable terminal such as a tablet PC, a smartphone, a personal digital assistant (PDA), a portable multimedia player (PMP), a game console, a wristwatch-type electronic device, and the like. However, the disclosure is not limited thereto. Alternatively, the display device DD may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it would be understood that the display device DD may be applied to any other electronic device(s) without departing from the concept of the disclosure.

The driving controller 100 receives an input signal including an input image signal RGB and a control signal CTRL. The driving controller 100 generates an output image signal DS by converting a data format of the input image signal RGB to be suitable for the interface specification of the data driving circuit 200. The driving controller 100 may output a first scan control signal SCS1, a second scan control signal SCS2, and a data control signal DCS for controlling an image to be displayed on the display panel DP.

The data driving circuit 200 receives the data control signal DCS and the output image signal DS from the driving controller 100. The data driving circuit 200 converts the output image signal DS into data signals and outputs the data signals to data lines DL1 to DLm to be described later. The data signals refer to analog voltages corresponding to a grayscale value of the output image signal DS.

The voltage generator 500 generates voltages used to operate the display panel DP. In an embodiment, the voltage generator 500 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm, and the pixels PX. The display panel DP may include a first driving circuit 300 and a second driving circuit 400. In an embodiment, the first driving circuit 300 is arranged on a first side of the display panel DP, and the second driving circuit 400 is arranged on a second side of the display panel DP. The scan lines GIL1 to GILn, GCL1 to GCLn, and GWL1 to GWLn+1 and the emission control lines EML1 to EMLn may be electrically connected to the first driving circuit 300 and the second driving circuit 400.

The scan lines GIL1 to GILn, GCL1 to GCLn, and GWL1 to GWLn+1 and the emission control lines EML1 to EMLn are arranged spaced from one another in the second direction DR2. The data lines DL1 to DLm extend from the data driving circuit 200 in a direction opposite to the second direction DR2, and are arranged spaced from one another in the first direction DR1.

In an embodiment, as shown in FIG. 1, the first driving circuit 300 and the second driving circuit 400 may be arranged to face each other with the pixels PX interposed therebetween, but the disclosure is not limited thereto. In an alternative embodiment, the display panel DP may include only one of the first driving circuit 300 and the second driving circuit 400.

The pixels PX are electrically connected to the scan lines GIL1 to GILn, GCL1 to GCLn, and GWL1 to GWLn+1, the emission control lines EML1 to EMLn, and the data lines DL1 to DLm. Each of pixels PX may be electrically connected to four scan lines and one emission control line. For example, as shown in FIG. 1, a first row of pixels may be connected to the scan lines GIL1, GCL1, GWL1, and GWL2 and the emission control line EML1. Furthermore, the j-th row of pixels may be connected to the scan lines GILj, GCLj, GWLj, and GWLj+1 and the emission control line EMLj.

Each of the pixels PX includes a light emitting element ED (see FIG. 2) and a pixel circuit PXC (see FIG. 2) for controlling the light emission of the light emitting element ED. The pixel circuit PXC may include one or more transistors and one or more capacitors. The first driving circuit 300 and the second driving circuit 400 may include transistors formed through a same process as the pixel circuit PXC.

Each of the pixels PX receives the first driving voltage ELVDD, the second driving voltage ELVSS, the first initialization voltage VINT1, and the second initialization voltage VINT2.

The first driving circuit 300 receives the first scan control signal SCS1 from the driving controller 100. In response to the first scan control signal SCS1, the first driving circuit 300 may output scan signals to the scan lines GIL1 to GILn, GCL1-GCLn, and GWL1-GWLn+1 and may output emission signals to the emission control lines EML1 to EMLn.

The second driving circuit 400 receives the second scan control signal SCS2 from the driving controller 100. In response to the second scan control signal SCS2, the second driving circuit 400 may output scan signals to the scan lines GIL1 to GILn, GCL1-GCLn, and GWL1-GWLn+1 and may output emission signals to the emission control lines EML1 to EMLn.

In an embodiment, the scan lines GIL1 to GILn may be referred to as "initialization scan lines", and the scan lines GCL1 to GCLn may be referred to as "compensation scan lines".

Figure 2:
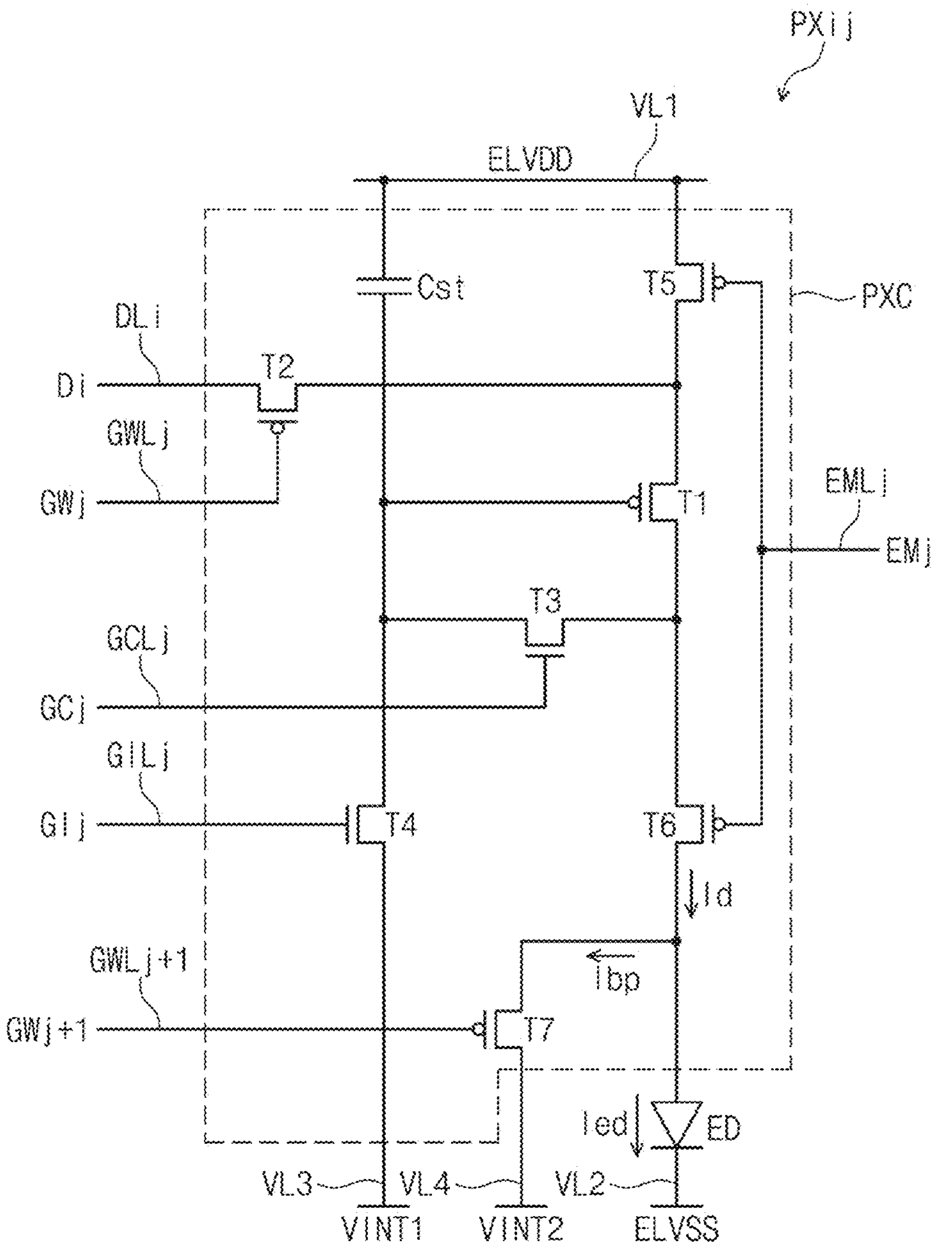
FIG. 2 is a circuit diagram of a pixel, according to an embodiment of the disclosure.

FIG. 2 is a circuit diagram of a pixel, according to an embodiment of the disclosure;

FIG. 2 illustrates an equivalent circuit diagram of a pixel PXij connected to an i-th data line DLi, a j-th scan lines GILj, GCLj, and GWLj and a (j+1)-th scan line GWLj+1, and a j-th emission control line EMLj illustrated in FIG. 1, where I and j are natural numbers.

Each of the pixels PX shown in FIG. 1 may have a same circuit configuration as the equivalent circuit diagram of the pixel PXij shown in FIG. 2. In an embodiment, the pixel circuit PXC of the pixel PXij includes first to seventh transistors T1, T2, T3, T4, T5, T6, T7, a capacitor Cst, and at least one light emitting element ED. In an embodiment, the light emitting element ED may be a light emitting diode.

In an embodiment, the third and fourth transistors T3 and T4 among the first to seventh transistors T1 to T7 are N-type transistors including an oxide semiconductor as a semiconductor layer thereof. In such an embodiment, each of the first, second, fifth, sixth, and seventh transistors T1, T2, T5, T6, and T7 is a P-type transistor having a low-temperature polycrystalline silicon (LTPS) semiconductor layer. However, the disclosure is not limited thereto. In an alternative embodiment, for example, all of the first to seventh transistors T1 to T7 may be P-type transistors or N-type transistors. In an embodiment, at least one of the first to seventh transistors T1 to T7 may be an N-type transistor, and the other(s) thereof may be P-type transistors.

The scan lines GILj, GCLj, GWLj, and GWLj+1 may deliver scan signals GIj, GCj, GWj, and GWj+1, respectively, and the emission control line EMLj may deliver an emission signal EMj. The data line DLi delivers a data signal Di. The data signal Di may have a voltage level corresponding to the input image signal RGB that is input to the display device DD (see FIG. 4). First to fourth driving voltage lines VL1, VL2, VL3, and VL4 may deliver the first driving voltage ELVDD, the second driving voltage ELVSS, the first initialization voltage VINT1, and the second initialization voltage VINT2, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with a first end of the capacitor Cst. The first transistor T1 may receive the data signal Di through the data line DLi based on a switching operation of the second transistor T2 and may supply a driving current Id to the light emitting diode ED.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj received through the scan line GWLj and may deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the compensation scan line GCLj. The third transistor T3 may be turned on in response to the compensation scan signal GCj transferred through the compensation scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third voltage line VL3 through which the first initialization voltage VINT1 is supplied, and a gate electrode connected to the initialization scan line GILj. The fourth transistor T4 may be turned on in response to the initialization scan signal GIj transferred through the initialization scan line GILj such that the first initialization voltage VINT1 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 may be simultaneously turned on in response to the emission signal EMj transferred through the emission control line EMLj. As such, the first driving voltage ELVDD may be compensated for through the diode-connected transistor T1 to be supplied to the light emitting element ED.

The seventh transistor T7 includes a first electrode connected to the anode of the light emitting element ED, a second electrode connected to the fourth voltage line VL4, and a gate electrode connected to the scan line GWLj+1. The seventh transistor T7 is turned on in response to the scan signal GWj+1 transferred through the scan line GWLj+1 and bypasses a current of the anode of the light emitting element ED to the fourth voltage line VL4.

The first end of the capacitor Cst is connected with the gate electrode of the first transistor T1 as described above, and a second end of the capacitor Cst is connected with the first driving voltage line VL1. The anode of the light emitting element ED may be connected to the second electrode of the sixth transistor T6, and a cathode thereof may be connected to the second driving voltage line VL2 that delivers the second driving voltage ELVSS.

In embodiments of the disclosure, a circuit configuration of the pixel PXij is not limited to that shown in FIG. 2. The number of transistors in the pixel PXij included in the pixel circuit PXC, the number of capacitors included therein, and the connection relationship may be modified in various manners.

Figure 3:
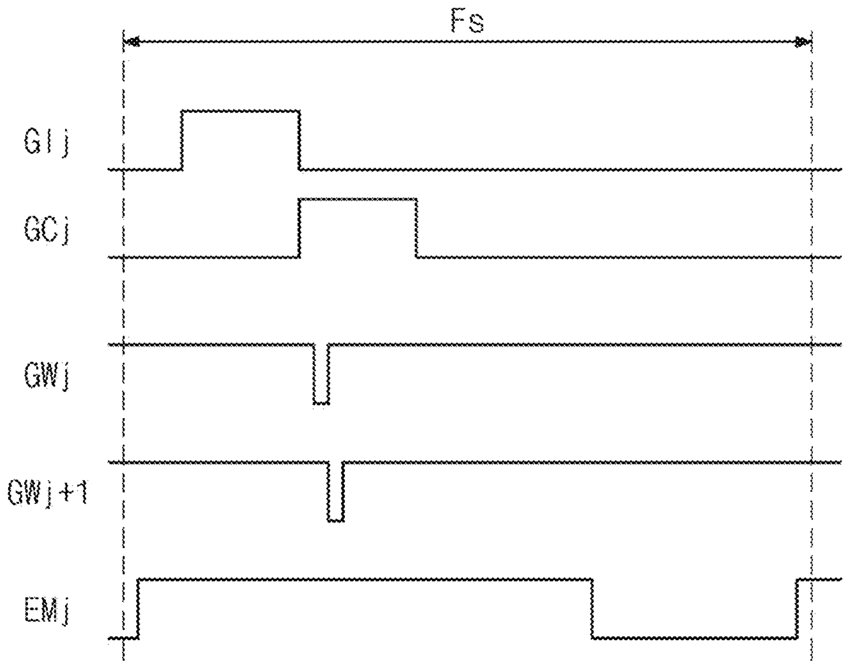
FIG. 3 is a timing diagram for describing an operation of a pixel illustrated in FIG. 2.

FIG. 3 is a timing diagram for describing an operation of a pixel illustrated in FIG. 2. Hereinafter, an operation of a display device according to an embodiment will be described with reference to FIGS. 2 and 3.

Referring to FIGS. 2 and 3, the initialization scan signal GIj having a high level is provided through the initialization scan line GILj during an initialization interval within one frame Fs. When the fourth transistor T4 is turned on in response to the initialization scan signal GIj having a high level, the first initialization voltage VINT1 is supplied to the gate electrode of the first transistor T1 through the fourth transistor T4 to initialize the first transistor T1.

Next, when the compensation scan signal GCj having a high level is supplied through the compensation scan line GCLj during a data programming and compensation interval, the third transistor T3 is turned on. The first transistor T1 is diode-connected by the third transistor T3 thus turned on to be forward-biased. At this time, the second transistor T2 is turned on by the scan signal GWj having a low level. Then, a compensation voltage (Di-Vth) obtained by reducing the voltage of the data signal Di supplied from the data line DLi by a threshold voltage (Vth) of the first transistor T1 is applied to the gate electrode of the first transistor T1. That is, a gate voltage applied to the gate electrode of the first transistor T1 may be a compensation voltage (Di-Vth).

The first driving voltage ELVDD and the compensation voltage (Di-Vth) may be respectively applied to opposite ends of the capacitor Cst, and charges corresponding to a voltage difference of the opposite ends of the capacitor Cst may be stored in the capacitor Cst.

After the second transistor T2 is turned on by the scan signal GWj having a low level, the seventh transistor T7 is turned on in response to the scan signal GWj+1 having a low level that is delivered through the scan line GWLj+1. A part of the driving current Id may be drained to the fourth driving voltage line VL4 through the seventh transistor T7 as the bypass current Ibp.

When the light emitting element ED emits light under the condition that a minimum current of the first transistor T1 flows as a driving current for the purpose of displaying a black image, the black image may not be normally displayed. Accordingly, the seventh transistor T7 in the pixel PXij according to an embodiment of the disclosure may drain (or disperse) a part of the minimum current of the first transistor T1 to a current path, which is different from a current path to the light emitting element ED, as the bypass current Ibp. Herein, the minimum current of the first transistor T1 means the current under the condition that the first transistor T1 is turned off because the gate-source voltage (Vgs) of the first transistor T1 is less than the threshold voltage Vth. As a minimum driving current (e.g., a current of about 10 pA or less) is delivered to the light emitting element ED, with the first transistor T1 turned off, an image of black luminance is expressed. In an embodiment, when the minimum driving current for displaying a black image flows, the influence of a bypass transfer of the bypass current Ibp may be great. In such an embodiment, when a large driving current for displaying an image such as a normal image or a white image flows, there may be almost no influence of the bypass current Ibp. Accordingly, when a driving current for displaying a black image flows, a light emitting current Ted of the light emitting element ED, which corresponds to a result of subtracting the bypass current Ibp drained through the sixth transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

Next, during a light emitting interval, the emission signal EMj supplied from the emission control line EMLj is changed from a high level to a low level. During a light emitting interval, the fifth transistor T5 and the sixth transistor T6 are turned on by the emission signal EMj having a low level. In this case, the driving current Id according to a voltage difference between the gate voltage of the gate electrode of the first transistor T1 and the first driving voltage ELVDD is generated and supplied to the light emitting element ED through the sixth transistor T6, and the current led flows through the light emitting element ED.

Figure 4:
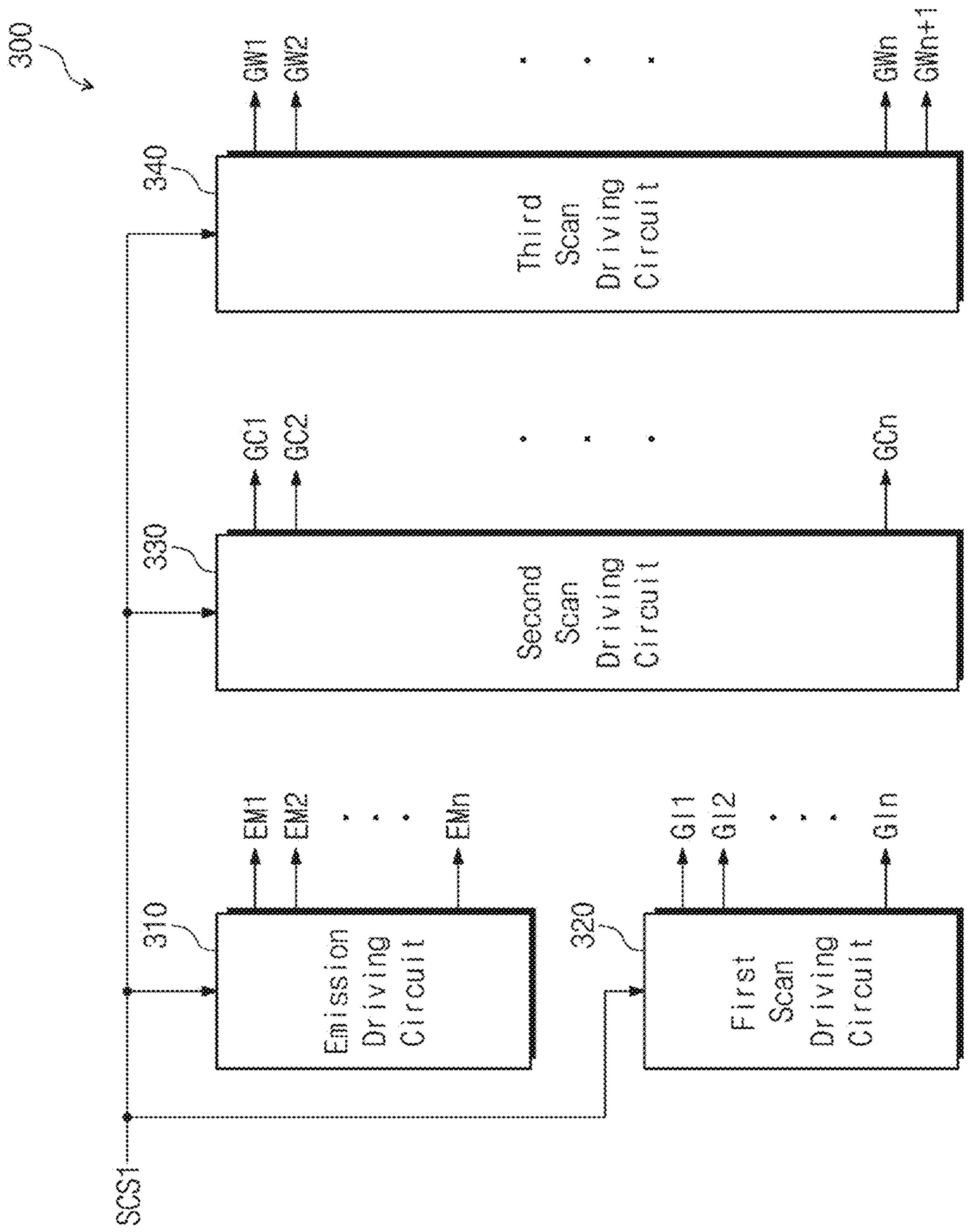
FIG. 4 is a block diagram illustrating the first driving circuit illustrated in FIG. 1.

FIG. 4 is a block diagram illustrating the first driving circuit 300 illustrated in FIG. 1.

Referring to FIG. 4, an embodiment of the first driving circuit 300 includes an emission driving circuit 310, a first scan driving circuit 320, a second scan driving circuit 330, and a third scan driving circuit 340.

In response to the first scan control signal SCS1, the emission driving circuit 310 outputs emission control signals EM1 to EMn to be provided to the emission control lines EML1 to EMLn shown in FIG. 1. In an embodiment, some of the emission control signals EM1 to EMn may be a same signal as one another. In an embodiment, for example, the emission control signals EM1 and EM2 may be a same signal as each other, and the emission control signals EM3 and EM4 may be a same signal as each other.

In response to the first scan control signal SCS1, the first scan driving circuit 320 outputs initialization scan signals GI1 to GIn to be provided to the initialization the scan lines GIL1 to GILn shown in FIG. 1. In an embodiment, some of the initialization scan signals GI1 to GIn may be a same signal as one another. In an embodiment, for example, the initialization scan signals GI1 and GI2 may be a same signal as each other, and the initialization scan signals GI3 and GI4 may be a same signal as each other.

In response to the first scan control signal SCS1, the second scan driving circuit 330 outputs compensation scan signals GC1 to GCn to be provided to the compensation the scan lines GCL1 to GCLn shown in FIG. 1.

In response to the first scan control signal SCS1, the third scan driving circuit 340 outputs scan signals GW1 to GWn+1 to be provided to the scan lines GWL1 to GWLn+1 shown in FIG. 1.

Figure 5:
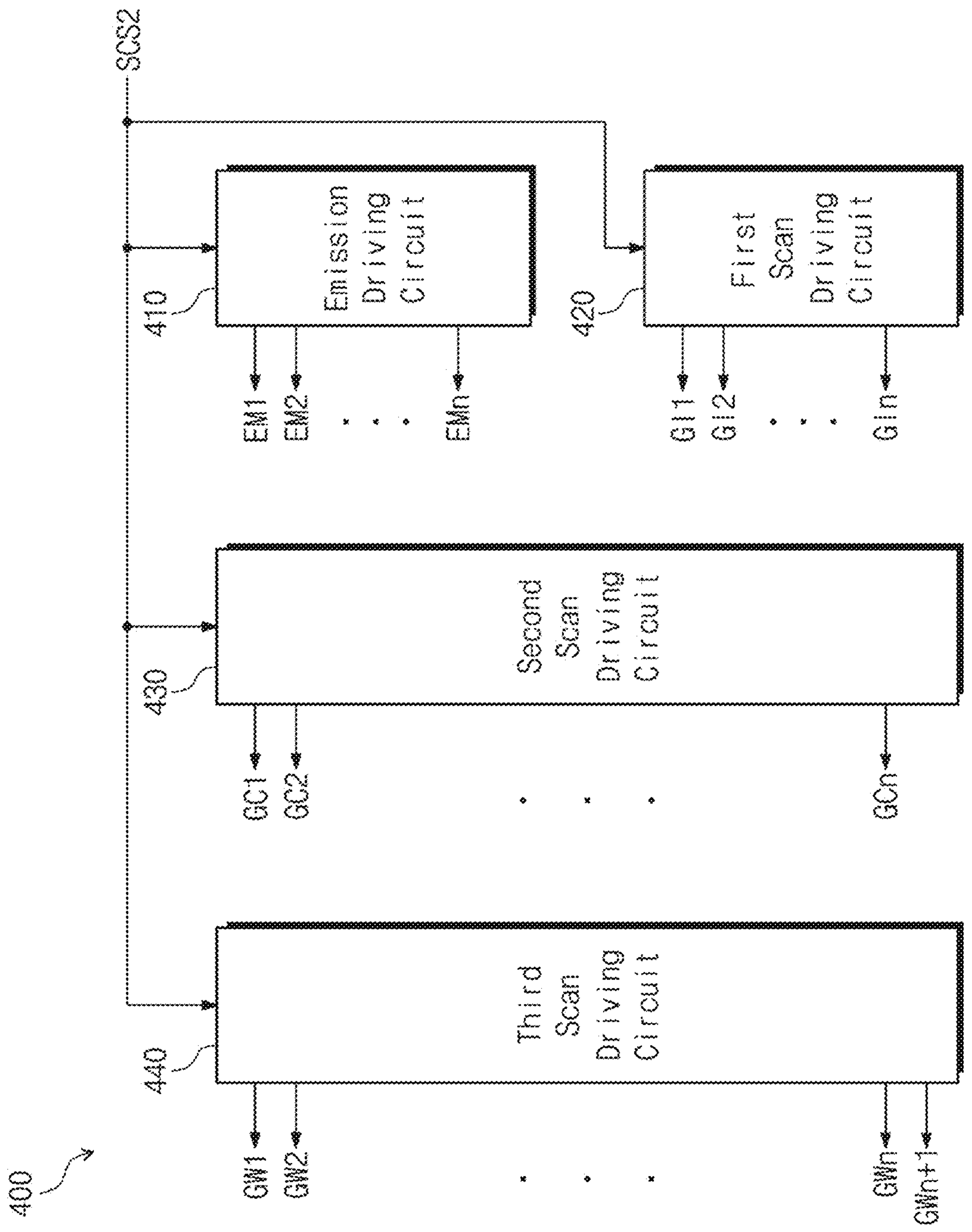
FIG. 5 is a block diagram illustrating the second driving circuit illustrated in FIG. 1.

FIG. 5 is a block diagram illustrating the second driving circuit 400 illustrated in FIG. 1.

Referring to FIG. 5, an embodiment of the second driving circuit 400 includes an emission driving circuit 410, a first scan driving circuit 420, a second scan driving circuit 430, and a third scan driving circuit 440.

In response to the second scan control signal SCS2, the emission driving circuit 410 outputs emission control signals EM1 to EMn to be provided to the emission control lines EML1 to EMLn shown in FIG. 1. In an embodiment, some of the emission control signals EM1 to EMn may be a same signal as one another. In an embodiment, for example, the emission control signals EM1 and EM2 may be a same signal as each other, and the emission control signals EM3 and EM4 may be a same signal as each other.

In response to the second scan control signal SCS2, the first scan driving circuit 420 outputs initialization scan signals GI1 to GIn to be provided to the initialization the scan lines GIL1 to GILn shown in FIG. 1. In an embodiment, some of the initialization scan signals GI1 to GIn may be a same signal as one another. In an embodiment, for example, the initialization scan signals GI1 and GI2 may be a same signal as each other, and the initialization scan signals GI3 and GI4 may be a same signal as each other.

In response to the second scan control signal SCS2, the second scan driving circuit 430 outputs compensation scan signals GC1 to GCn to be provided to the compensation the scan lines GCL1 to GCLn shown in FIG. 1.

In response to the second scan control signal SCS2, the third scan driving circuit 440 outputs scan signals GW1 to GWn to be provided to the scan lines GWL1 to GWLn shown in FIG. 1.

Figure 6:
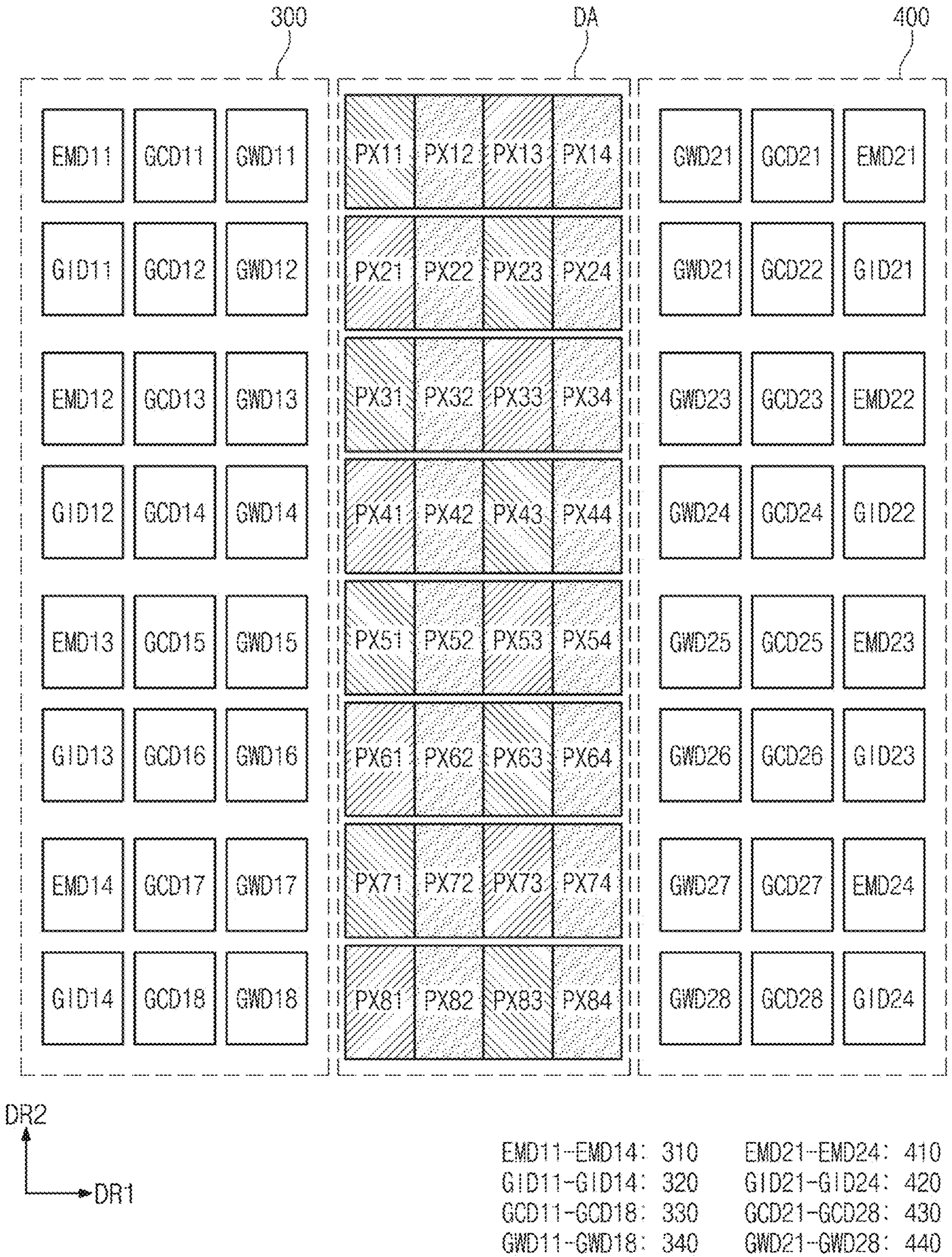
FIG. 6 is a block diagram illustrating a first driving circuit illustrated in FIG. 4 and a second driving circuit illustrated in FIG. 5.

FIG. 6 is a block diagram illustrating the first driving circuit 300 illustrated in FIG. 4 and the second driving circuit 400 illustrated in FIG. 5.

Referring to FIGS. 4 to 6, in an embodiment, pixels PX11 to PX14, PX21 to PX24, PX31 to PX34, PX41 to PX44, PX51 to PX54, PX61 to PX64, PX71 to PX74, and PX81 to PX84 are arranged in the display area DA.

FIG. 6 shows a portion of an embodiment of the pixels PX in the display area DA in which four pixels are arranged in the first direction DR1 and eight pixels are arranged in the second direction DR2 in the display area DA. However, the number of the pixels arranged in the display area DA may be variously changed.

The pixels PX11, PX23, PX31, PX43, PX51, PX63, PX71, and PX83 may be first color pixels (e.g., red pixels), the pixels PX13, PX21, PX33, PX41, PX53, PX61, PX73, and PX81 may be second color pixels (e.g., blue pixels), and the remaining pixels PX12, PX14, PX22, PX24, PX32, PX34, PX42, PX44, PX52, PX54, PX62, PX64, PX72, PX74, PX82, and PX84 may be third color pixels (e.g., green pixels).

The emission driving circuit 310 in the first driving circuit 300 includes emission stages EMD11 to EMD14. Each of the emission stages EMD11 to EMD14 may drive two rows of pixels (or two pixel rows) corresponding thereto. In an embodiment, for example, the emission stage EMD11 may drive two rows of pixels PX11 to PX14, and PX21 to PX24 corresponding thereto, the emission stage EMD12 may drive two rows of pixels PX31 to PX34, and PX41 to PX44 corresponding thereto, the emission stage EMD13 may drive two rows of pixels PX51 to PX54, and PX61 to PX64 corresponding thereto, and the emission stage EMD14 may drive two rows of pixels PX71 to PX74, and PX81 to PX84 corresponding thereto.

The first scan driving circuit 320 in the first driving circuit 300 includes initialization stages GID11 to GID14. Each of the initialization stages GID11 to GID14 may drive two rows of pixels corresponding thereto. In an embodiment, for example, the initialization stage GID11 may drive two rows of pixels PX11 to PX14, and PX21 to PX24 corresponding thereto; the initialization stage GID12 may drive two rows of pixels PX31 to PX34, and PX41 to PX44 corresponding thereto, the initialization stage GID13 may drive two rows of pixels PX51 to PX54, and PX61 to PX64 corresponding thereto, and the initialization stage GID14 may drive two rows of pixels PX71 to PX74, and PX81 to PX84 corresponding thereto.

The second scan driving circuit 330 in the first driving circuit 300 includes compensation stages GCD11 to GCD18. each of the compensation stages GCD11 to GCD18 may drive one row of pixels corresponding thereto. In an embodiment, for example, the compensation stage GCD11 may drive one row of pixels PX11 to PX14 corresponding thereto, and the compensation stage GCD18 may drive one row of pixels PX81 to PX84 corresponding thereto.

The third scan driving circuit 340 in the first driving circuit 300 includes scan stages GWD11 to GWD18. Each of the scan stages GWD11 to GWD18 may drive one row of pixels corresponding thereto. In an embodiment, for example, the scan stage GWD11 may drive one row of pixels PX11 to PX14 corresponding thereto, and the scan stage GWD18 may drive one row of pixels PX81 to PX84 corresponding thereto.

The emission driving circuit 410 in the second driving circuit 400 includes emission stages EMD21 to EMD24. Each of the emission stages EMD21 to EMD24 may drive two rows of pixels corresponding thereto. In an embodiment, for example, the emission stage EMD21 may drive two rows of pixels PX11 to PX14, and PX21 to PX24 corresponding thereto; the emission stage EMD22 may drive two rows of pixels PX31 to PX34, and PX41 to PX44 corresponding thereto, the emission stage EMD23 may drive two rows of pixels PX51 to PX54, and PX61 to PX64 corresponding thereto, and the emission stage EMD24 may drive two rows of pixels PX71 to PX74, and PX81 to PX84 corresponding thereto.

The first scan driving circuit 420 in the second driving circuit 400 includes initialization stages GID21 to GID24. Each of the initialization stages GID21 to GID24 may drive two rows of pixels corresponding thereto. In an embodiment, for example, the initialization stage GID21 may drive two rows of pixels PX11 to PX14, and PX21 to PX24 corresponding thereto, the initialization stage GID22 may drive two rows of pixels PX31 to PX34, and PX41 to PX44 corresponding thereto, the initialization stage GID23 may drive two rows of pixels PX51 to PX54, and PX61 to PX64 corresponding thereto, and the initialization stage GID24 may drive two rows of pixels PX71 to PX74, and PX81 to PX84 corresponding thereto.

The second scan driving circuit 430 in the second driving circuit 400 includes compensation stages GCD21 to GCD28. Each of the compensation stages GCD21 to GCD28 may drive one row of pixels corresponding thereto. In an embodiment, for example, the compensation stage GCD21 may drive one row of pixels PX11 to PX14 corresponding thereto, and the compensation stage GCD28 may drive one row of pixels PX81 to PX84 corresponding thereto.

The third scan driving circuit 440 in the second driving circuit 400 includes scan stages GWD21 to GWD28. Each of the scan stages GWD21 to GWD28 may drive one row of pixels corresponding thereto. In an embodiment, for example, the scan stage GWD21 may drive one row of pixels PX11 to PX14 corresponding thereto, and the scan stage GWD28 may drive one row of pixels PX81 to PX84 corresponding thereto.

Figure 7:
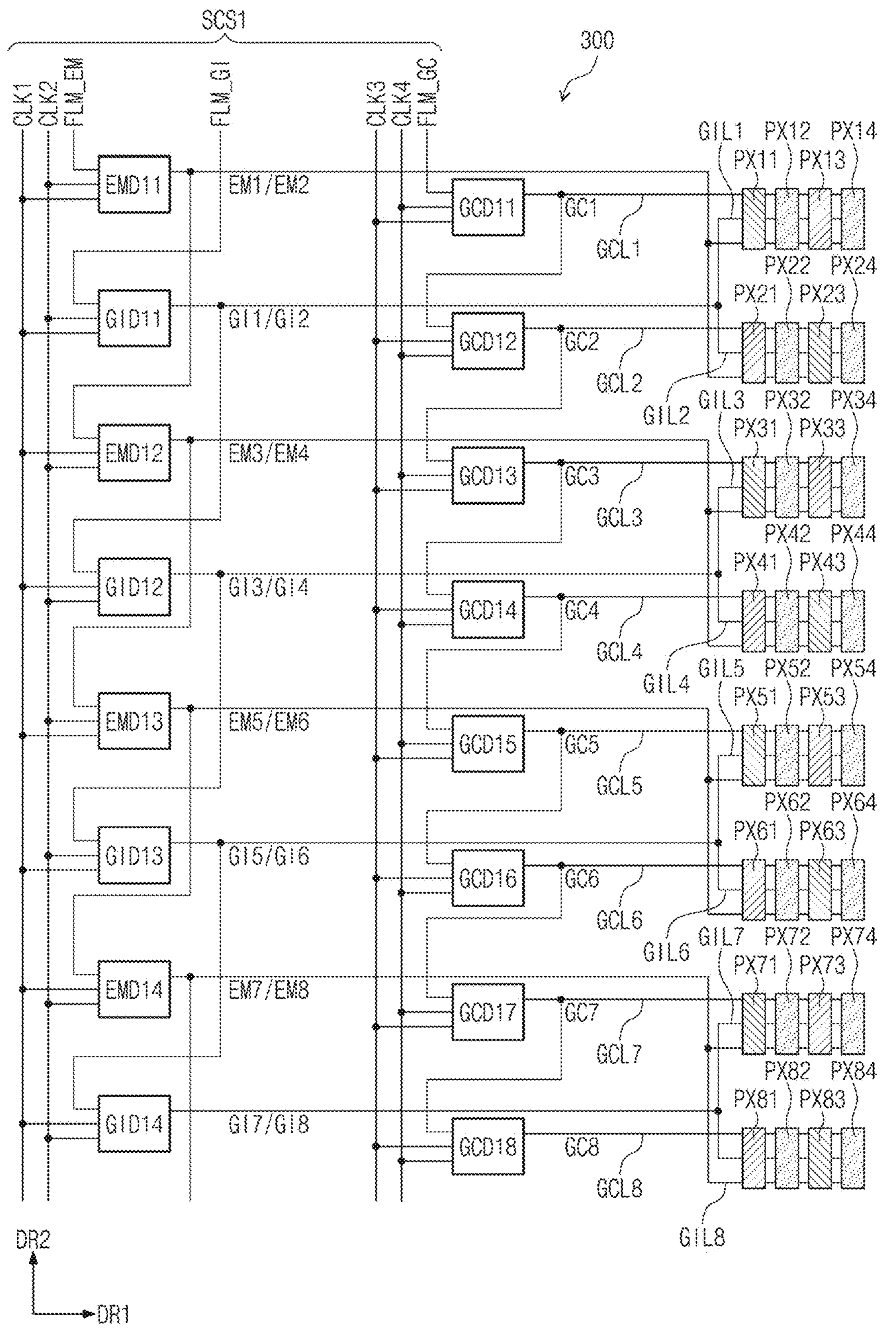
FIG. 7 shows emission stages, initialization stages, and compensation stages in a first driving circuit shown in FIG. 6.

FIG. 7 shows the emission stages EMD11 to EMD14, the initialization stages GID11 to GID14, and the compensation stages GCD11 to GCD18 in the first driving circuit 300 shown in FIG. 6. The scan stages GWD11 to GWD18 in the first driving circuit 300 are not shown in FIG. 7. In an embodiment, the scan stages GWD11 to GWD18 may drive the scan lines GWL1 to GWLn in a manner similar to that of the compensation stages GCD11 to GCD18.

Referring to FIGS. 6 and 7, each of the emission stages EMD11 to EMD14 receives a first clock signal CLK1 and a second clock signal CLK2 and a carry signal, and outputs emission control signals (EM1/EM2, EM3/EM4, EM5/EM6, EM7/EM8). Each of the emission control signals (EM1/EM2, EM3/EM4, EM5/EM6, EM7/EM8) may be provided to two rows of pixels corresponding thereto. In an embodiment, for example, the emission control signals (EM1/EM2) may be provided in common to two rows of pixels PX11 to PX14 and PX21 to PX24. Furthermore, the emission control signals (EM3/EM4) may be provided in common to two rows of pixels PX31 to PX34, and PX41 to PX44.

The pixel PXij shown in FIG. 2 receives the emission control signal EMj. Although not shown in the drawing, the pixel PXij+1 may receive the emission control signal EMj+1. In this case, the emission control signal EMj and the emission control signal EMj+1 are a same signal as each other and may be expressed as the emission control signals (EMj/EMj+1). The emission control signals (EMj/EMj+1) may be expressed as the emission control signal EMj and the emission control signal EMj+1.

The first emission stage EMD11 receives an emission start signal FLM_EM as a carry signal. Each of the emission stages EMD12 to EMD14 other than the first emission stage EMD11 receives the emission control signal output from the previous emission stage as a carry signal. In an embodiment, for example, the second emission stage EMD12 receives the emission control signals (EM1/EM2) output from the first emission stage EMD11 as a carry signal.

Each of the initialization stages GID11 to GID14 receives a first clock signal CLK1 and a second clock signal CLK2 and a carry signal, and outputs initialization scan signals (GI1/GI2, GI3/GI4, GI5/GI6, GI7/GI8). Each of the initialization scan signals (GI1/GI2, GI3/GI4, GI5/GI6, GI7/GI8) may be provided to two initialization scan lines corresponding thereto. In an embodiment, for example, the initialization scan signals (GI1/GI2) may be commonly provided to the initialization scan lines GIL1 and GIL2 connected to two rows of pixels PX11 to PX14 and PX21 to PX24. In such an embodiment, the initialization scan signals (GI3/GI4) may be commonly provided to the initialization scan lines GIL3 and GIL4 connected to two rows of pixels PX31 to PX34 and PX41 to PX44.

The pixel PXij shown in FIG. 2 receives the initialization scan signal GIj. Although not shown in the drawing, the pixel PXij+1 may receive the initialization scan signal GIj+1. In this case, the initialization scan signal GIj and the initialization scan signal GIj+1 are a same signal as each other, and may be expressed as the initialization scan signals (GIj/GIj+1). The initialization scan signals (GIj/GIj+1) may be expressed as the initialization scan signal GIj and the initialization scan signal GIj+1.

The first initialization stage GID11 receives a first start signal FLM_GI as a carry signal. Each of the initialization stages GID12 to GID14 other than the first initialization stage GID11 receives an initialization scan signal output from the previous initialization stage as a carry signal. In an embodiment, for example, the second initialization stage GID12 receives the initialization scan signal (GI1/GI2) output from the first initialization stage GID11 as a carry signal.

FIG. 7 illustrates that the emission stages EMD11 to EMD14 and the initialization stages GID11 to GID14 receive the first clock signal CLK1 and the second clock signal CLK2 in common, but the disclosure is not limited thereto. Alternatively, the emission stages EMD11 to EMD14 and the initialization stages GID11 to GID14 may receive different clock signals from each other.

Each of the compensation stages GCD11 to GCD18 receives a third clock signal CLK3, a fourth clock signal CLK4, and a carry signal, and the compensation stages GCD11 to GCD18 output the compensation scan signals GC1 to GC8, respectively. Each of the compensation scan signals GC1 to GC8 may be provided to a compensation scan line connected to one row of pixels corresponding thereto. In an embodiment, for example, the compensation scan signal GC1 may be provided to the compensation scan line GCL1 connected to the pixels PX11 to PX14. In such an embodiment, the compensation scan signal GC2 may be provided to the compensation scan line GCL2 connected to the pixels PX21 to PX24.

The first compensation stage GCD11 receives a second start signal FLM_GC as a carry signal. Each of the compensation stages GCD12 to GCD14 other than the first compensation stage GCD11 receives a compensation scan signal output from the previous compensation stage as a carry signal. In an embodiment, for example, the second compensation stage GCD12 receives the compensation scan signal GC1 output from the first compensation stage GCD11 as a carry signal.

In an embodiment, the first to fourth clock signals CLK1 to CLK4, the emission start signal FLM_EM, the first start signal FLM_GI, and the second start signal FLM_GC may be included in the first scan control signal SCS1 provided from the driving controller 100 illustrated in FIG. 1.

In an embodiment, as described above, each of the initialization stages GID11 to GID14 corresponds to two rows of pixels, and each of the compensation stages GCD11 to GCD18 corresponds to one row of pixels, but the disclosure is not limited thereto.

Embodiments of the disclosure may be applied to a case where the number of rows corresponding to each of the initialization stages GID11 to GID14 is different from the number of rows corresponding to each of the compensation stages GCD11 to GCD18. In an embodiment, each of the initialization stages GID11 to GID14 may correspond to four rows of pixels, and each of the compensation stages GCD11 to GCD18 may correspond to one row of pixels. In an embodiment, each of the initialization stages GID11 to GID14 may correspond to four rows of pixels, and each of the compensation stages GCD11 to GCD18 may correspond to two rows of pixels.

The second driving circuit 400 illustrated in FIG. 6 may include a circuit configuration similar to that of the first driving circuit 300 illustrated in FIG. 7.

Figure 8:
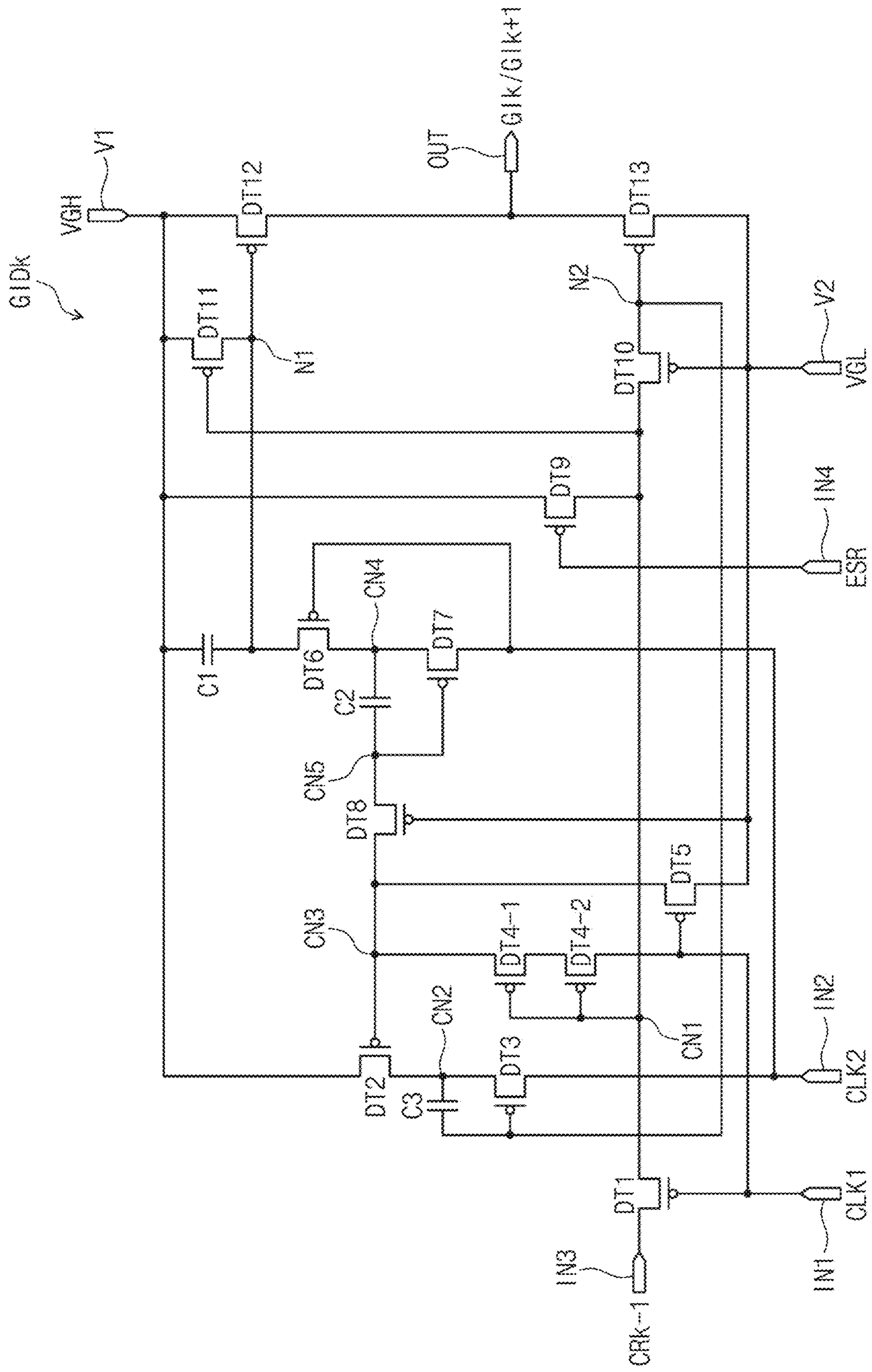
FIG. 8 is a circuit diagram illustrating a k-th initialization stage in a first driving circuit, according to an embodiment of the disclosure.

FIG. 8 is a circuit diagram illustrating a k-th initialization stage GIDk in the first driving circuit 300, according to an embodiment of the disclosure.

FIG. 8 illustrates the k-th initialization stage GIDk among the initialization stages GID11 to GID14 shown in FIG. 7. Each of the initialization stages GID11 to GID14 illustrated in FIG. 7 may have a same circuit configuration as the initialization stage GIDk illustrated in FIG. 8.

Referring to FIG. 8, an embodiment of the initialization stage GIDk includes first to fourth input terminals IN1, IN2, IN3 and IN4, first and second voltage terminals V1 and V2, and an output terminal OUT. The initialization stage GIDk further includes driving transistors, e.g., first to thirteenth driving transistors DT1 to DT13, and driving capacitors, e.g., first to third driving capacitors C1 to C3.

The first driving transistor DT1 is connected between the third input terminal IN3 and a first control node CN1 and includes a gate electrode connected to the first input terminal IN1.

The second driving transistor DT2 is connected between the first voltage terminal V1 and a second control node CN2, and includes a gate electrode connected to a third node NC3. The third driving transistor DT3 is connected between the second control node CN2 and the second input terminal IN2, and includes a gate electrode connected to a second node N2.

The fourth driving transistors DT4-1 and DT4-2 are connected between the third control node CN3 and the first input terminal IN1, and include gate electrodes connected to the first control node CN1. In an embodiment, the fourth driving transistors DT4-1 and DT4-2 may be connected to each other in series between the third control node CN3 and the first input terminal IN1.

The fifth driving transistor DT5 is connected between the third control node CN3 and the second voltage terminal V2, and includes a gate electrode connected to the first input terminal IN1. The sixth driving transistor DT6 is connected between a first node N1 and a fourth control node CN4 and includes a gate electrode connected to the second input terminal IN2. The seventh driving transistor DT7 is connected between the fourth control node CN4 and the second input terminal IN2 and includes a gate electrode connected to a fifth control node CN5.

The eighth driving transistor DT8 is connected between the third control node CN3 and the fifth control node CN5 and includes a gate electrode connected to the second voltage terminal V2.

The ninth driving transistor DT9 is connected between the first voltage terminal V1 and the first control node CN1 and includes a gate electrode connected to the fourth input terminal IN4.

The tenth driving transistor DT10 is connected between the first control node CN1 and the second node N2 and includes a gate electrode connected to the second voltage terminal V2.

The eleventh driving transistor DT11 is connected between the first voltage terminal V1 and the first node N1 and includes a gate electrode connected to the first control node CN1.

The twelfth driving transistor DT12 is connected between the first voltage terminal V1 and the output terminal OUT and includes a gate electrode connected to the first node N1. The thirteenth driving transistor DT13 is connected between the output terminal OUT and the second voltage terminal V2 and includes a gate electrode connected to the second node N2.

The first driving capacitor C1 is connected between the first voltage terminal V1 and the first node N1. The second driving capacitor C2 is connected between the fourth control node CN4 and the fifth control node CN5. The third driving capacitor C3 is connected between the second control node CN2 and the second node N2.

The first input terminal IN1 receives the first clock signal CLK1, and the second input terminal IN2 receives the second clock signal CLK2. The first clock signal CLK1 and the second clock signal CLK2 may be complementary signals. When the first input terminal IN1 of the k-th driving stage STk receives the first clock signal CLK1 and the second input terminal IN2 of the k-th driving stage STk receives the second clock signal CLK2, the first input terminal IN1 of the (k+1)-th driving stage STk+1 may receive the second clock signal CLK2, and the second input terminal IN2 may receive the first clock signal CLK1.

The third input terminal IN3 may receive the compensation scan signal GCk−1 output from the previous stage STk−1 as a carry signal CRk−1.

The initialization stage GIDk may further include the fourth input terminal IN4 for receiving an off control signal ESR. While the off control signal ESR is at a low level, the signal level of the second node N2 may be maintained at a high level.

The initialization stage GIDk may output the initialization scan signals (GIk/GIk+1) to the output terminal OUT in response to signals input from the first to fourth input terminals IN1, IN2, IN3, and IN4.

Figure 9:
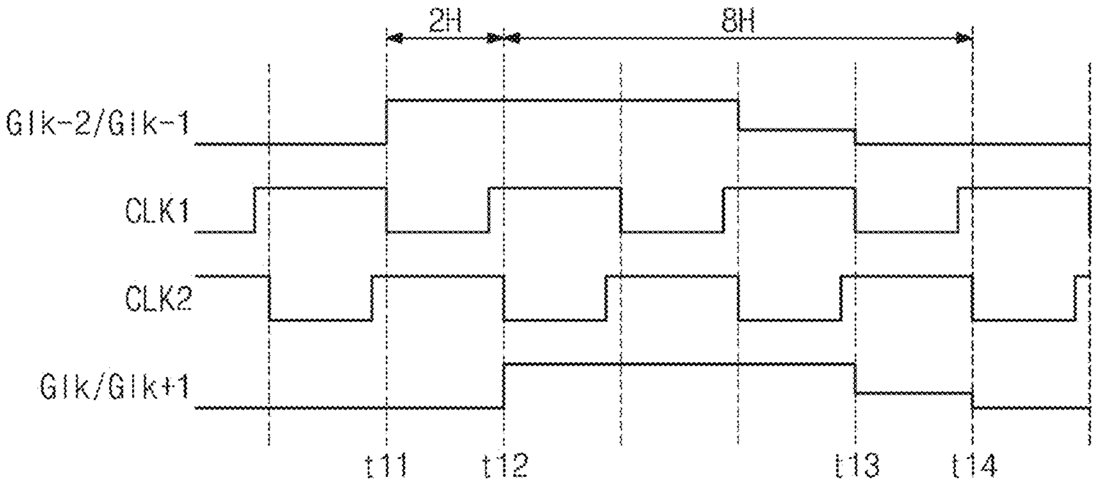
FIG. 9 is a timing diagram for describing an operation of an initialization stage shown in FIG. 8.

FIG. 9 is a timing diagram for describing an operation of the initialization stage GIDk shown in FIG. 8.

Referring to FIGS. 8 and 9, in a case where the first clock signal CLK1 transitions to a low level at time t11 (or a point in time at t11 in FIG. 9), when the carry signal CRk−1 (i.e., the initialization scan signals (GIk−2/GIk−1)) input to the third input terminal IN3 is at a high level, voltage levels of the first control node CN1 and the second node N2 transition to high levels. At time t11, because the second clock signal CLK2 is at a high level, the first node N1 is maintained at a high level. Accordingly, the initialization scan signals (GIk/GIk+1) may be maintained at the previous state, that is, a low level.

When the first clock signal CLK1 is at a high level and the second clock signal CLK2 transitions to a low level at time t12, a voltage level of the first node N1 transitions to a low level. Accordingly, at time t12, the initialization scan signals (GIk/GIk+1) may transition to high levels.

In a case where the first clock signal CLK1 transitions to a low level at time t13, when the carry signal CRk−1 (i.e., the initialization scan signals (GIk−2/GIk−1)) input to the third input terminal IN3 is at a low level, a voltage level of the second node N2 transitions to a low level. As the voltage level of the second node N2 transitions to a low level, the thirteenth driving transistor DT13 is turned on. At time t13, the first control node CN1 is at low level, and thus a voltage level of the first node N1 transitions to a high level as the eleventh driving transistor DT11 is turned on. Accordingly, the initialization scan signals (GIk/GIk+1) transition to low levels.

When the first clock signal CLK1 is at a high level and the second clock signal CLK2 transitions to a low level at time t14, the voltage level of the second node N2 is lowered by the third driving capacitor C3. As a result, at time t14, the initialization scan signals (GIk/GIk+1) may be sufficiently lowered to a low level.

As described in FIG. 7, because the initialization scan signals (GIk−2/GIk−1) and the initialization scan signals (GIk/GIk+1) are provided to pixels arranged in two rows, a time (or a period of time) from a time point (or a point in time) at which the initialization scan signals (GIk−2/GIk−1) transition to high levels, i.e., time t11, to a time point at which the next initialization scan signals (GIk/GIk+1) transition to high levels, i.e., time t12, may be two horizontal periods (2H). A time during which the initialization scan signals (GIk−2/GIk−1) are maintained at high levels and a time during which the initialization scan signals (GIk/GIk+1) are maintained at high levels may each be eight horizontal periods (8H).

Figure 10:
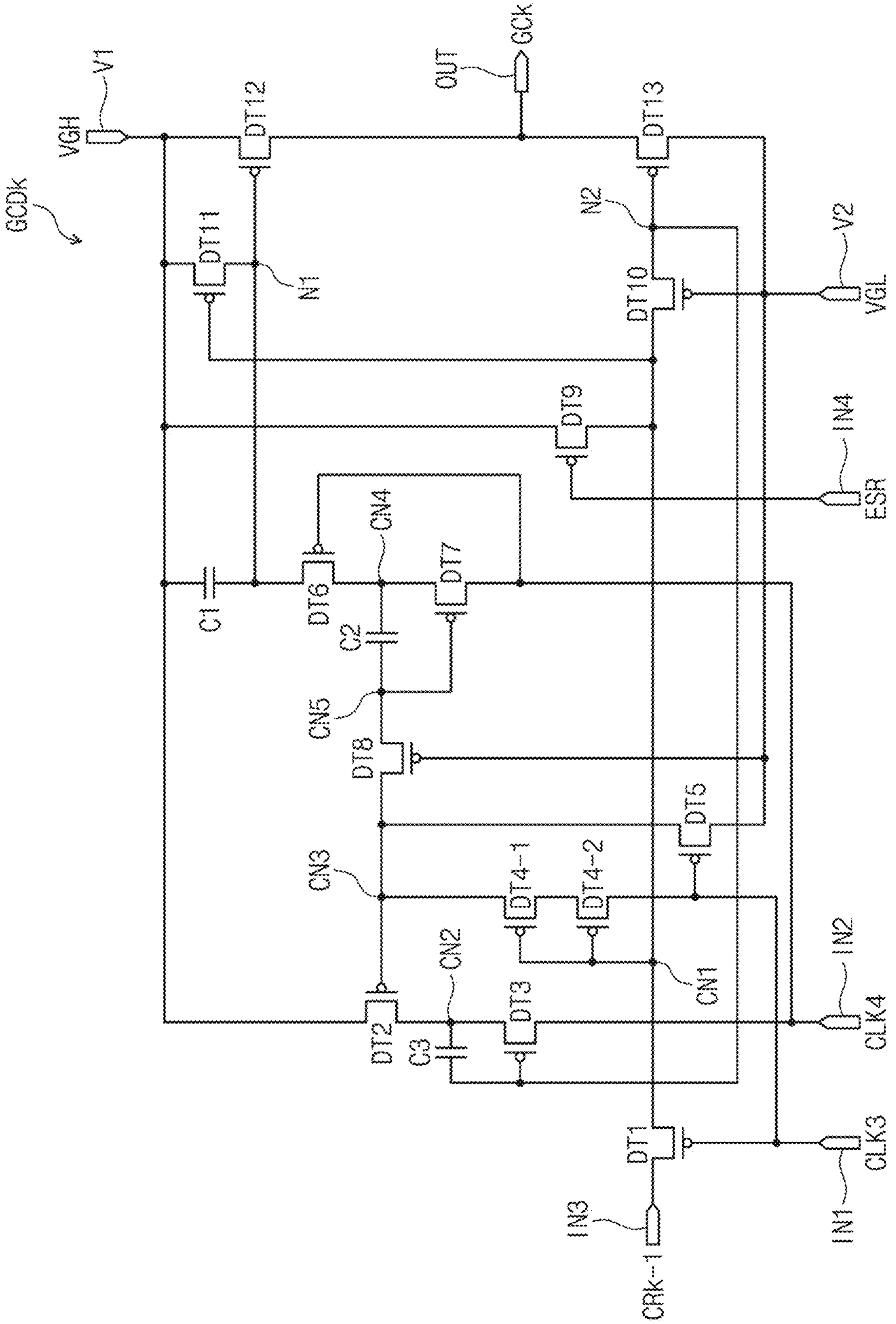
FIG. 10 is a circuit diagram illustrating a k-th compensation stage in a first driving circuit, according to an embodiment of the disclosure.

FIG. 10 is a circuit diagram illustrating a k-th compensation stage GCDk in the first driving circuit 300, according to an embodiment of the disclosure.

FIG. 10 shows the k-th compensation stage GCDk among the compensation stages GCD11 to GCD18 shown in FIG. 7. Each of the compensation stages GCD11 to GID18 illustrated in FIG. 7 may have a same circuit configuration as the compensation stage GCDk illustrated in FIG. 10.

Referring to FIG. 10, an embodiment of the compensation stage GCDk includes first to fourth input terminals IN1, IN2, IN3, and IN4, first and second voltage terminals V1 and V2, and an output terminal OUT. The compensation stage GCDk further includes driving transistors, e.g., first to thirteenth driving transistors DT1 to DT13, and driving capacitors, e.g., first to third driving capacitors C1 to C3.

The compensation stage GCDk has a configuration similar to that of the initialization stage GIDk shown in FIG. 8, and thus the same reference numerals are used for the same components, and any repetitive detailed descriptions thereof will be omitted to avoid redundancy.

The compensation stage GCDk may output a compensation scan signal GCk to the output terminal OUT in response to signals input from the first to fourth input terminals IN1, IN2, IN3, and IN4.

Figure 11:
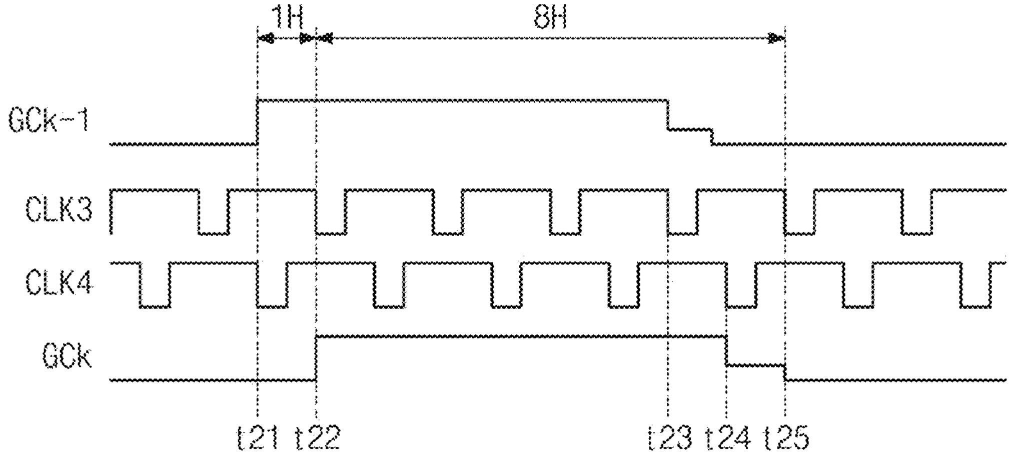
FIG. 11 is a timing diagram for describing an operation of a compensation stage shown in FIG. 10.

FIG. 11 is a timing diagram for describing an operation of the compensation stage GCDk shown in FIG. 10.

Referring to FIGS. 10 and 11, because the third clock signal CLK3 is at a high level when the carry signal CRk−1 (i.e., the compensation scan signal GCk−1) input to the third input terminal IN3 transitions to a high level at time t21 (or a point in time at t21 in FIG. 11), the compensation scan signal GCk−1 is not delivered to the first control node CN1 and the second node N2.

When the third clock signal CLK3 transitions to a low level at time t22, the compensation scan signal GCk−1 having a high level may be delivered to the first control node CN1 and the second node N2 through the first driving transistor DT1. When voltage levels of the first control node CN1 and the second node N2 transition to high levels, the eighth driving transistor DT8 and the tenth driving transistor DT10 are turned off. The fourth clock signal CLK4 is at a high level at time t22. Accordingly, because the sixth driving transistor DT6 is turned off, the second node N2 may be maintained at the previous low level. When the second node N2 transitions to a low level, the ninth driving transistor DT9 is turned on, and thus the compensation scan signal GCk transitions to a high level.

When the third clock signal CLK3 transitions to a low level at time t23, the voltage level of each of the first control node CN1 and the second node N2 may be changed to a voltage level corresponding to the compensation scan signal GCk−1 by the first driving transistor DT1. However, because the voltage level of the compensation scan signal GCk−1 is not sufficient to turn on the thirteenth driving transistor DT13, the compensation scan signal GCk is maintained at a high level. When the fourth clock signal CLK4 is at a high level at time t23, a voltage level of the fourth control node CN4 transitions to a high level.

When the fourth clock signal CLK4 at time t24 is at a low level, the sixth driving transistor DT6 is turned on, and thus the voltage level of the first node N1 increases depending on the voltage level of the fourth control node CN4. Moreover, because the eleventh driving transistor DT11 and the thirteenth driving transistor DT13 are weakly turned on by voltage levels of the first control node CN1 and the second node N2, a voltage level of the compensation scan signal GCk is lowered.

When the third clock signal CLK3 at a time t25 is a low level, the first driving transistor DT1 is turned on, and thus a voltage level of each of the first control node CN1 and the second node N2 may be changed to a low level corresponding to a voltage level of the compensation scan signal GCk−1. Accordingly, the twelfth driving transistor DT12 is turned off and the thirteenth driving transistor DT13 is turned on, and thus the compensation scan signal GCk transitions to a low level.

As described in FIG. 7, because the compensation scan signal GCk−1 and the compensation scan signal GCk are provided to pixels arranged in one row, a time from a time point at which the compensation scan signal GCk−1 transitions to a high level from a time point at which the next compensation scan signal GCk transitions to a high level may be 1 horizontal period (1H).

Figure 12:
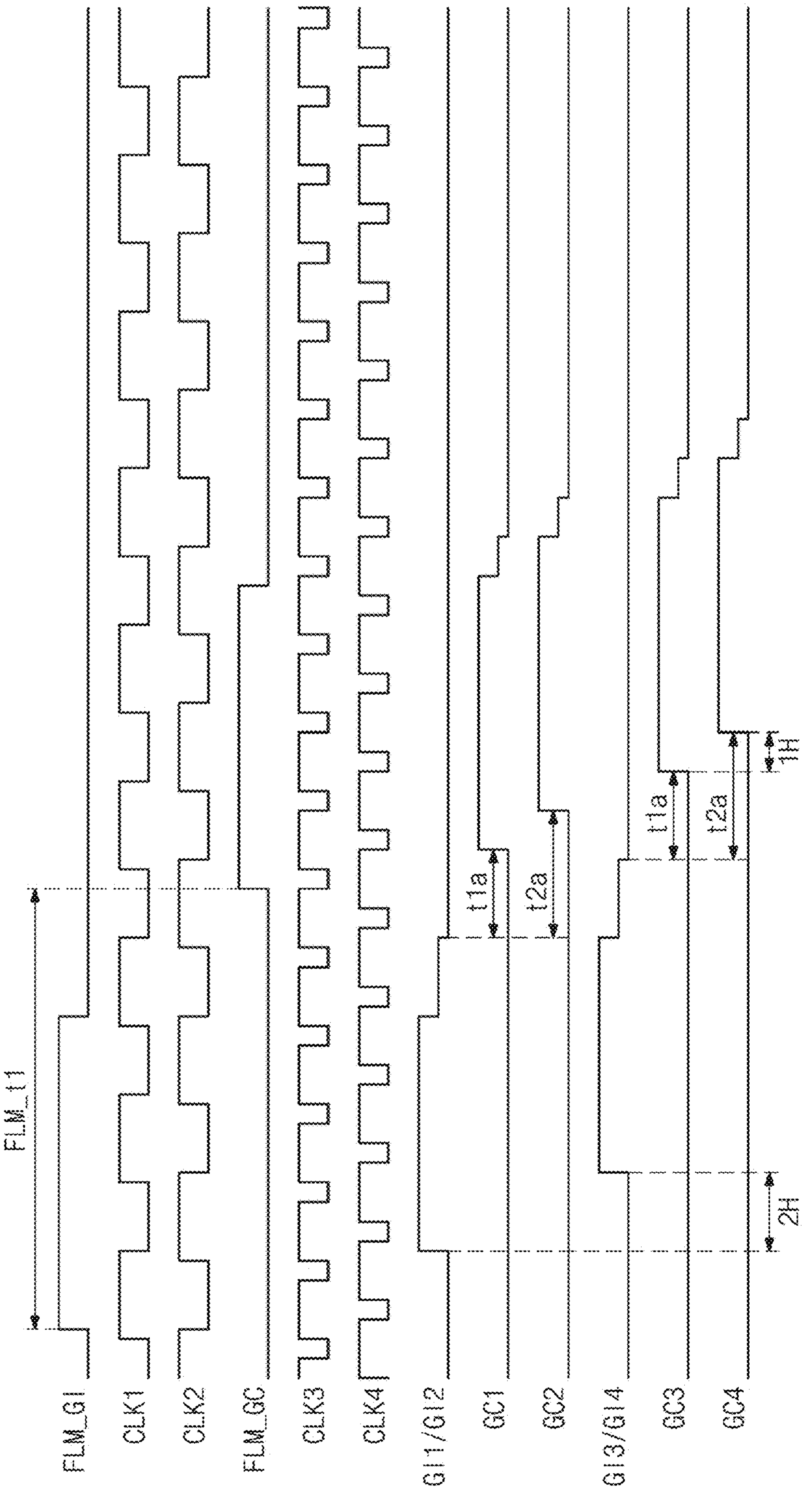
FIG. 12 is a timing diagram for describing an operation of a first driving circuit shown in FIG. 7.

FIG. 12 is a timing diagram for describing an operation of the first driving circuit 300 shown in FIG. 7.

FIG. 12 shows only the initialization scan signals (GI1/GI2, GI3/GI4) and the compensation scan signals GC1 to GC4.

In an embodiment, as described above with reference to FIGS. 2 and 3, during the initialization interval, first of all, the initialization scan signals (GI1/GI2) transition to high levels and then the initialization scan signals (GI1/GI2) transition from high levels to low levels. Afterward, during the data programming and compensation interval, the compensation scan signals GC1 and GC2 may sequentially transition to low levels.

In an embodiment, as shown in FIG. 12, where a time duration from a time point at which the initialization scan signals (GI1/GI2) transition to low levels to a time point at which the compensation scan signal GC1 transitions to a high level is referred to (or defined) as a "first delay time" t1*a* and a time duration from a time point at which the initialization scan signals (GI1/GI2) transition to low levels to a time point at which the compensation scan signal GC2 transitions to a high level is referred to as a "second delay time" t2*a*, the first delay time t1*a* is less (or shorter) than the second delay time t2*a* (i.e., first delay time t1*a*<second delay time t2*a*). In an embodiment, the first delay time t1*a* may be greater than or equal to 2 horizontal periods (2H). In an embodiment, the second delay time t2*a* may be greater than or equal to 3 horizontal periods (3H).

Figure 13A:
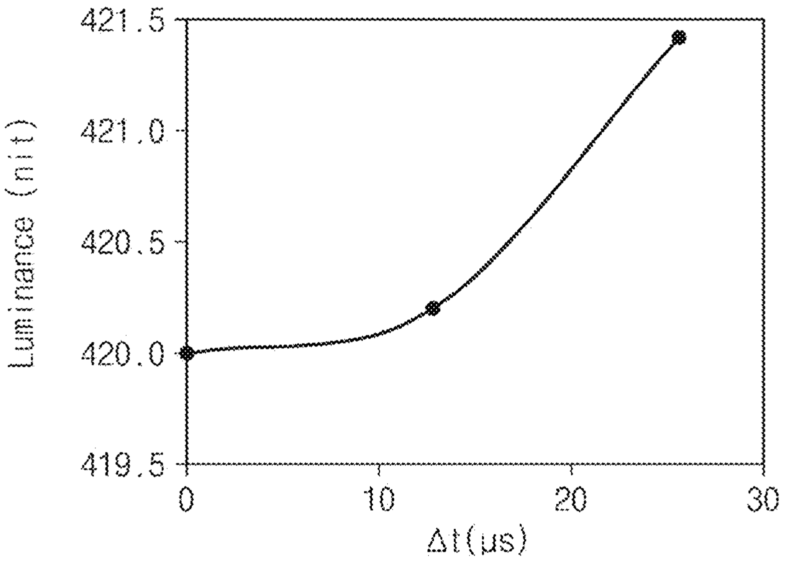
FIGS. 13A to 13C illustrate experimental results on luminance of a display device according to a delay time from a time point at which initialization scan signals transition to low levels to a time point at which compensation scan signal transitions to a high level.
Figure 13B:
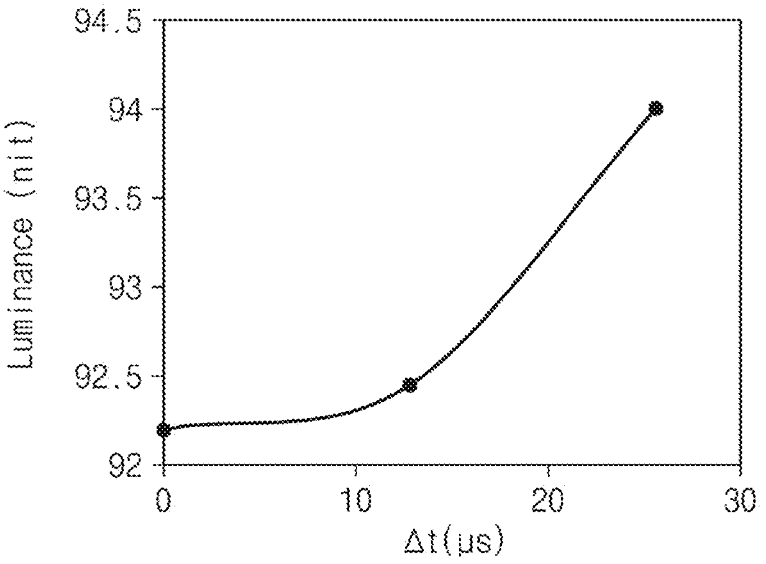
Figure 13C:
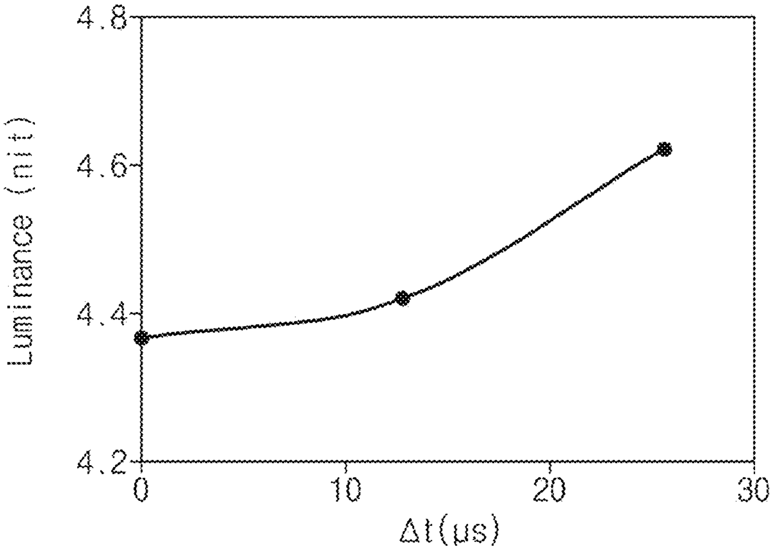

FIGS. 13A to 13C illustrate experimental results on luminance of a display device according to a delay time from a time point at which the initialization scan signals (GI1/GI2) transition to low levels to a time point at which the compensation scan signal GC1 transitions to a high level.

FIGS. 13A to 13C illustrate experimental results on the luminance of a display device according to a delay time when grayscale levels of the input image signal RGB are level 255, level 128, and level 32, respectively.

As shown in FIGS. 13A to 13C, luminance generally increases as a delay time increases although there is a difference depending on the grayscale levels of the input image signal RGB.

Referring back to FIGS. 7 and 12, because each of the initialization scan signals (GI1/GI2, GI3/GI4) is provided to two rows of pixels and the compensation scan signals GC1 to GC4 are provided to one row of pixels, a user may perceive a luminance difference between a row of pixels that receive the odd-numbered compensation scan signals GC1 and GC3 and a row of pixels that receive the odd-numbered compensation scan signals GC2 and GC4.

In particular, as shown in FIGS. 13A to 13C, a luminance change rapidly increases when a delay time is greater than a predetermined time (e.g., about 10 μs) although the luminance change is not great under a condition that the delay time from a time point at which the initialization scan signals (GI1/GI2) transition to low levels to a time point at which the compensation scan signal GC1 transitions to a high level is not greater than the predetermined time (e.g., about 10 μs). Accordingly, it is desired to minimize both the first delay time t1*a* and the second delay time t2*a*.

Figure 14:
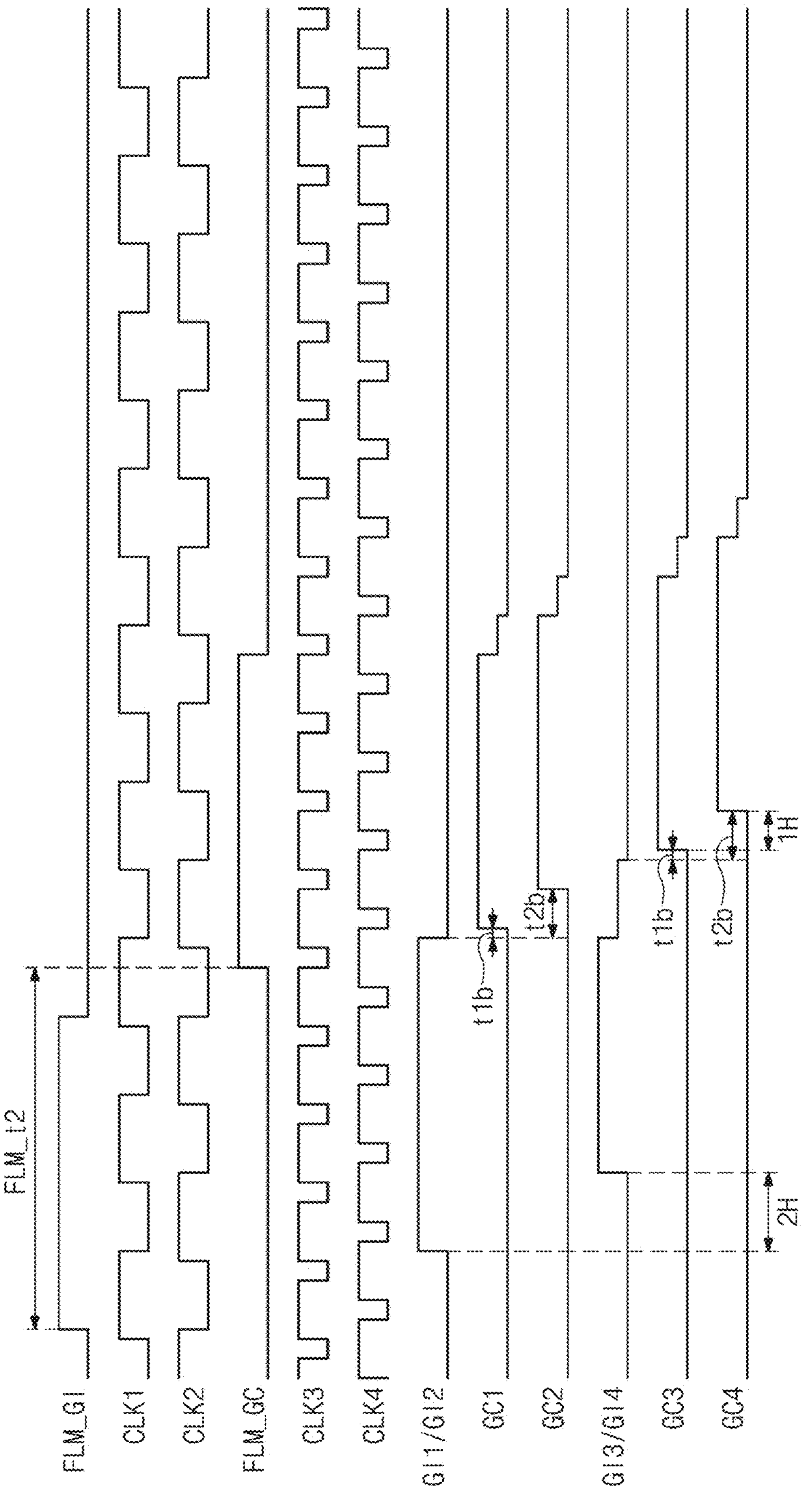
FIG. 14 is a timing diagram for describing an operation of a first driving circuit shown in FIG. 7, according to an embodiment of the disclosure.

FIG. 14 is a timing diagram for describing an operation of the first driving circuit 300 shown in FIG. 7, according to an embodiment of the disclosure.

FIG. 14 shows only the initialization scan signals (GI1/GI2, GI3/GI4) and the compensation scan signals GC1 to GC4.

In an embodiment, as described above with reference to FIGS. 2 and 3, during the initialization interval, first of all, the initialization scan signals (GI1/GI2) transition to high levels and then the initialization scan signals (GI1/GI2) transition from high levels to low levels. Afterward, during the data programming and compensation interval, the compensation scan signals GC1 and GC2 may sequentially transition to low levels.

In an embodiment, as shown in FIG. 14, the initialization scan signals (GI1/GI2) are provided to the two initialization scan lines GIL1 and GIL2, respectively. The compensation scan signals GC1 and GC2 are provided to the compensation scan lines GCL1 and GCL2, respectively. Accordingly, a frequency of each of the third and fourth clock signals CLK3 and CLK4 is higher than a frequency of each of the first and second clock signals CLK1 and CLK2. In an embodiment, the frequency of each of the third and fourth clock signals CLK3 and CLK4 may be twice the frequency of each of the first and second clock signals CLK1 and CLK2.

A time from a time point at which the initialization scan signals (GI1/GI2) transition to high levels to a time point at which the initialization scan signals (GI3/GI4) transition to high levels may be 2 horizontal periods (2H). A time from a time point at which the compensation scan signal GC1 transitions to a high level to a time point at which the compensation scan signal GC2 transitions to a high level may be 1 horizontal period (1H). In such an embodiment, a time from a time point at which the compensation scan signal GC2 transitions to a high level to a time point at which the compensation scan signal GC3 transitions to a high level, and a time from a time point at which the compensation scan signal GC3 transitions to a high level to a time point at which the compensation scan signal GC4 transitions to a high level may each be 1 horizontal period (1H).

In an embodiment, as shown in FIG. 14, where a time from a time point at which the initialization scan signals (GI1/GI2) transition to low levels to a time point at which the compensation scan signal GC1 transitions to a high level is referred to (or defined) as a "first delay time" t1*b* and a time from a time point at which the initialization scan signals (GI1/GI2) transition to low levels to a time point at which the compensation scan signal GC2 transitions to a high level is referred to as a "second delay time" t2*b*, the first delay time t1*b* is less than the second delay time t2*b* (i.e., first delay time t1*b*<second delay time t2*b*). In an embodiment, the first delay time t1*b* may be less than or equal to 1 horizontal period (1H), and the second delay time t2*b* may be less than or equal to 2 horizontal periods (2H).

In an embodiment, the first delay time t1*b* shown in FIG. 14 is less than the first delay time t1*a* shown in FIG. 12 (i.e., t1*b*<t1*a*). In such an embodiment, the second delay time t2*b* shown in FIG. 14 is less than the second delay time t2*a* shown in FIG. 12 (i.e., t2*b*<t2*a*).

In an embodiment, the first delay time t1*b* and the second delay time t2*b* may be reduced by adjusting a start delay time FLM_t2 from a time point at which the first start signal FLM_GI transitions to an active level (e.g., a high level) to a time point at which the second start signal FLM_GC transitions to an active level (e.g., a high level). The start delay time FLM_t2 shown in FIG. 14 is less than the start delay time FLM_t1 shown in FIG. 12.

The driving controller 100 illustrated in FIG. 1 may output the first scan control signal SCS1 and the second scan control signal SCS2, each of which includes the first start signal FLM_GI and the second start signal FLM_GC. The driving controller 100 may adjust the first delay time t1*b* and the second delay time t2*b* by adjusting a time (or an active start time) at which each of the first start signal FLM_GI and the second start signal FLM_GC transitions to a high level. In an embodiment, the driving controller 100 may adjust the active start time of each of the first start signal FLM_GI and the second start signal FLM_GC in a way such that the first delay time t1*b* is less than or equal to 1 horizontal period (1H) and the second delay time t2*b* is less than or equal to 2 horizontal periods (2H). In such an embodiment, a difference in luminance between the odd-numbered row of pixels and the even-numbered row of pixels may be minimized by minimizing the first delay time t1*b* and the second delay time t2*b*.

Figure 15:
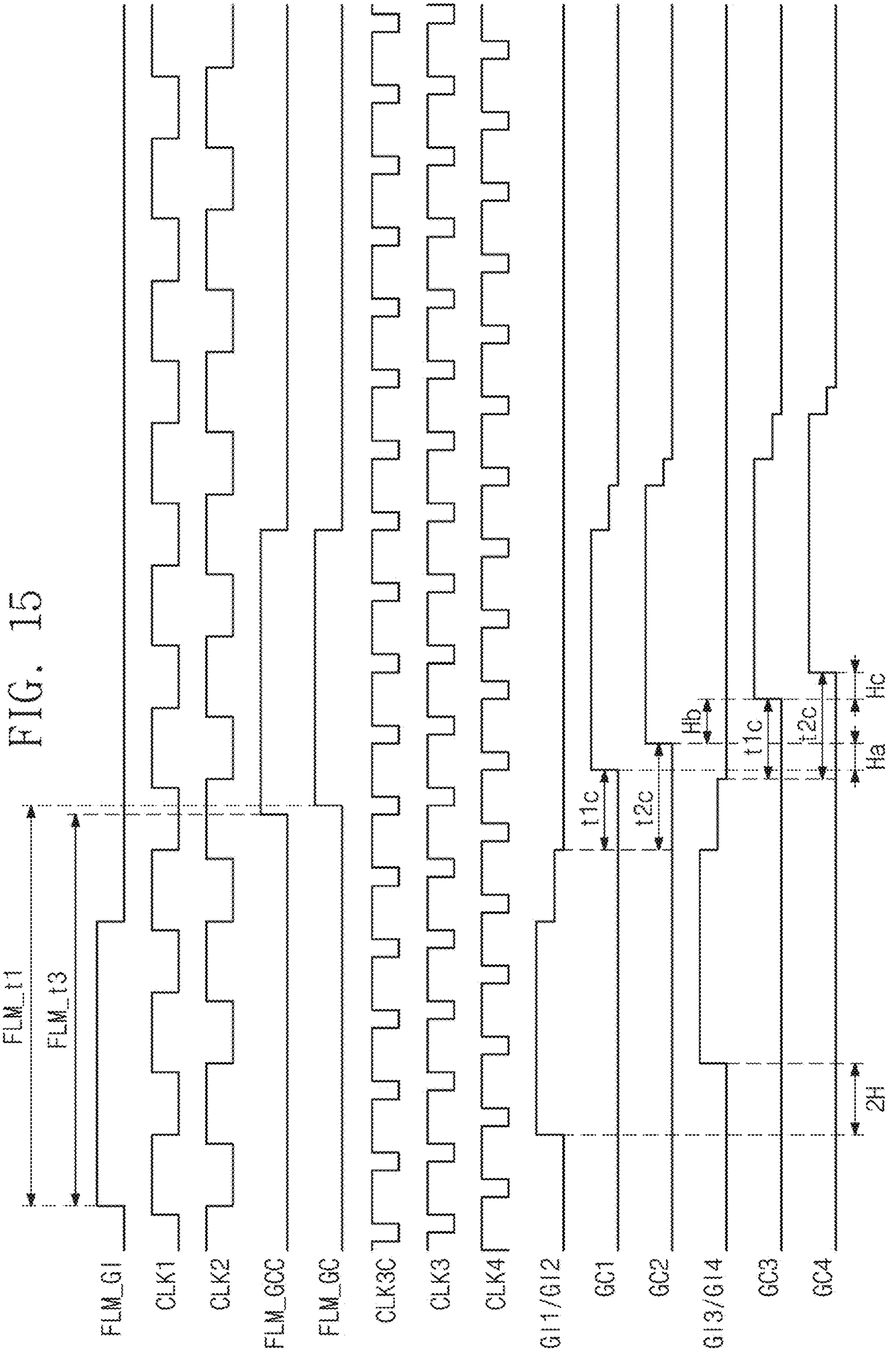
FIG. 15 is a timing diagram for describing an operation of a first driving circuit shown in FIG. 7, according to an embodiment of the disclosure.

FIG. 15 is a timing diagram for describing an operation of the first driving circuit 300 shown in FIG. 7, according to an embodiment of the disclosure.

FIG. 15 shows only the initialization scan signals (GI1/GI2, GI3/GI4) and the compensation scan signals GC1 to GC4.

Referring to FIGS. 7 and 15, in an embodiment where a time from a time point at which the initialization scan signals (GI1/GI2) transition to low levels to a time point at which the compensation scan signal GC1 transitions to a high level is referred to (or defined) as a "first delay time" t1*c* and a time from a time point at which the initialization scan signals (GI1/GI2) transition to low levels to a time point at which the compensation scan signal GC2 transitions to a high level is referred to as a "second delay time" t2*c*, the first delay time t1*c* is less than the second delay time t2*c* ("first delay time t1*c*<second delay time t2*c*"). In such an embodiment, the second delay time t2*c* shown in FIG. 15 may be less than the second delay time t2*a* shown in FIG. 12 (t2*c*<t2*a*).

In an embodiment, a time from a time point at which the initialization scan signals (GI1/GI2) transition to high levels to a time point at which the initialization scan signals (GI3/GI4) transition to high levels may be 2 horizontal periods (2H).

In an embodiment, a first time Ha from a time point at which the compensation scan signal GC1 transitions to a high level to a time point at which the compensation scan signal GC2 transitions to a high level may be less than 1 horizontal period (1H) (i.e., Ha<1H).

A second time Hb from a time point at which the compensation scan signal GC2 transitions to a high level to a time point at which the compensation scan signal GC3 transitions to a high level may be 1 horizontal period (1H).

In an embodiment, a third time Hc from a time point at which the compensation scan signal GC3 transitions to a high level to a time point at which the compensation scan signal GC4 transitions to a high level may be less than 1 horizontal period (1H) (i.e., Hc<1H).

In such an embodiment, each of the first time Ha and the third time Hc is less than 1 horizontal period (1H). In such an embodiment, each of the first time Ha and the third time Hc is less than the second time Hb.

In such an embodiment, a difference in luminance between the odd-numbered row of pixels and the even-numbered row of pixels may be minimized by adjusting each of the first time Ha and the third time Hc to a value less than 1 horizontal period (1H).

In such an embodiment, the first time Ha may be reduced by adjusting a start delay time FLM_t3 from a time point at which the first start signal FLM_GI transitions to an active level (e.g., a high level) to a time point at which a second start signal FLM_GCC transitions to an active level (e.g., a high level). The start delay time FLM_t3 shown in FIG. 15 is less than the start delay time FLM_t1 shown in FIG. 12.

FIG. 15 illustrates the second start signal FLM_GC and the third clock signal CLK3 shown in FIG. 12 for easy comparison between the start delay time FLM_t3 and the start delay time FLM_t1 shown in FIG. 12.

The driving controller 100 illustrated in FIG. 1 may output the first scan control signal SCS1 and the second scan control signal SCS2, each of which includes the first start signal FLM_GI and the second start signal FLM_GCC. The driving controller 100 may adjust the first time Ha by adjusting a time (or an active start time) at which the second start signal FLM_GCC transitions to a high level. The time at which the third clock signal CLK3 transitions to an active level (e.g., a low level) may be changed in synchronization with the second start signal FLM_GCC. In FIG. 15, a time at which the third clock signal CLK3 transitions from a high level to a low level may be set between a time at which the fourth clock signal CLK4 transitions from a low level to a high level and a time at which the third clock signal CLK3 transitions from a high level to a low level.

In such an embodiment a difference in luminance between the odd-numbered row of pixels and the even-numbered row of pixels may be minimized by minimizing the first time Ha.

Figure 16:
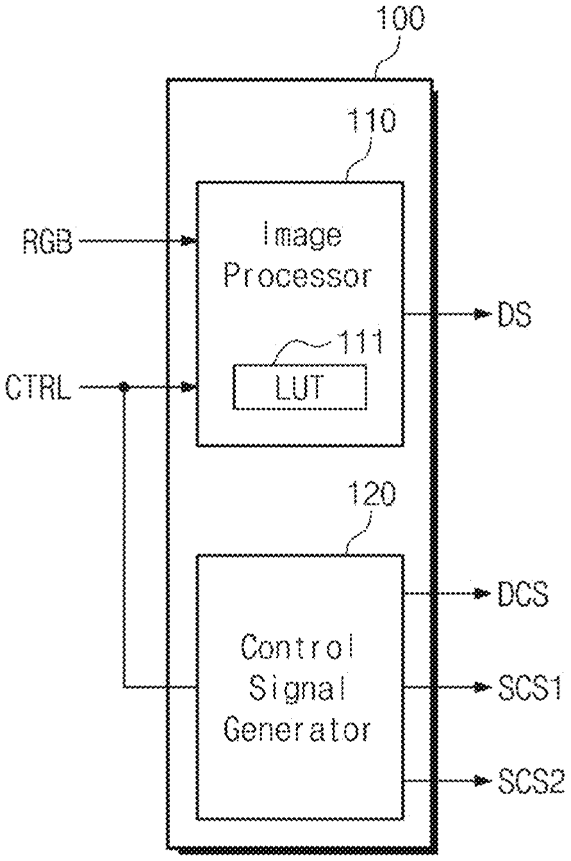
FIG. 16 is a block diagram of an embodiment of a driving controller shown in FIG. 1

FIG. 16 is a block diagram of an embodiment of the driving controller 100 shown in FIG. 1.

An embodiment of the driving controller 100 includes an image processor 110 and a control signal generator 120.

The image processor 110 outputs the output image signal DS in response to the input image signal RGB and the control signal CTRL. In an embodiment, when the input image signal RGB corresponds to an odd-numbered row of pixels, the image processor 110 may perform a compensation operation based on a first compensation value and may output the output image signal DS. When the input image signal RGB corresponds to an even-numbered row of pixels, the image processor 110 may perform the compensation operation based on a second compensation value and may output the output image signal DS.

Each of the first compensation value and the second compensation value may vary depending on a grayscale level of the input image signal RGB, a luminance dimming level of the input image signal RGB, and the like. The image processor 110 may include a lookup table 111 for storing the first compensation value and the second compensation value corresponding to the grayscale level of the input image signal RGB, the luminance dimming level of the input image signal RGB, and the like.

The image processor 110 may compensate for the input image signal RGB with reference to the first compensation value and second compensation value, which are stored in the lookup table 111, and may output the output image signal DS.

The first compensation value and the second compensation value may be set to a value for minimizing the difference in luminance between the odd-numbered row of pixels and the even-numbered row of pixels.

The control signal generator 120 outputs the data control signal DCS, the first scan control signal SCS1, and the second scan control signal SCS2 in response to the input image signal RGB and the control signal CTRL.

Figure 17:
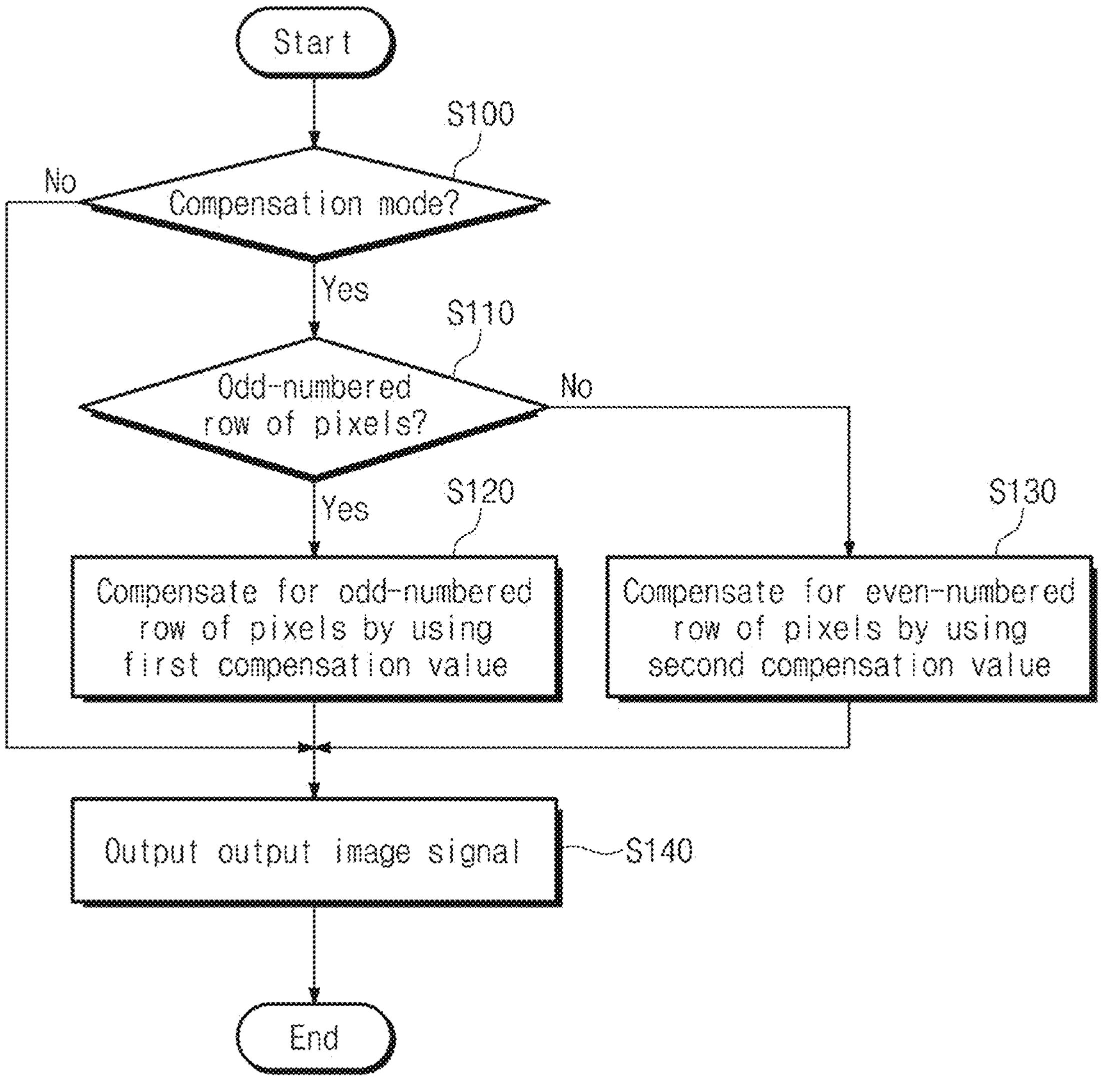
FIG. 17 is a flowchart for describing an operation of a driving controller shown in FIG. 16.

FIG. 17 is a flowchart for describing an operation of the driving controller 100 shown in FIG. 16.

Referring to FIGS. 16 and 17, in an embodiment, the image processor 110 determines whether an operating mode is a compensation mode (operation S100).

As illustrated in FIG. 7, when the display device is in a state where each of the initialization scan signals (GI1/GI2, GI3/GI4, GI5/GI6, GI7/GI8) output from the initialization stages GID11 to GID14 is provided to two rows of pixels corresponding thereto and each of the compensation scan signals GC1 to GC8 output from the compensation stages GCD11 to GCD18 is provided to one row of pixels corresponding thereto, the operating mode thereof may be a compensation mode.

When the input image signal RGB corresponds to an odd-numbered row of pixels, the image processor 110 compensates for the input image signal RGB corresponding to the odd-numbered row of pixels by using a first compensation value (operation S120).

When the input image signal RGB corresponds to an even-numbered row of pixels, the image processor 110 compensates for the input image signal RGB corresponding to the even-numbered row of pixels by using a second compensation value (operation S130).

The image processor 110 outputs the output image signal DS (operation S140).

FIG. 17 illustrates that both the input image signal RGB corresponding to the odd-numbered row of pixels and the input image signal RGB corresponding to the even-numbered row of pixels are compensated, but the disclosure is not limited thereto. In an alternative embodiment, only the input image signal RGB corresponding to one of the odd-numbered row of pixels and the even-numbered row of pixels may be compensated.

In such an embodiment, a difference in luminance between the odd-numbered row of pixels and the even-numbered row of pixels may be minimized by minimizing the first delay time t1*b* and the second delay time t2*b* as illustrated in FIG. 14 or minimizing the first time Ha as illustrated in FIG. 15.

In such an embodiment, the difference in luminance between the odd-numbered row of pixels and the even-numbered row of pixels may be further minimized by compensating for at least one of the input image signal RGB corresponding to the odd-numbered row of pixels and the input image signal RGB corresponding to the even-numbered row of pixels by using a compensation value.

In embodiments of the disclosure, as described herein, a display device may minimize luminance change due to a time difference between an initialization scan signal and a compensation scan signal. Accordingly, in such embodiments, the display quality may be effectively prevented from being deteriorated due to the time difference between the initialization scan signal and the compensation scan signal.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a first pixel connected to a first initialization scan line and a first compensation scan line, and a second pixel connected to a second initialization scan line and a second compensation scan line;

a scan driving circuit which provides a first initialization scan signal to the first initialization scan line and the second initialization scan line in common, and provides a first compensation scan signal and a second compensation scan signal to the first compensation scan line and the second compensation scan line, respectively; and a driving controller which controls the scan driving circuit, wherein a delay time from a time point at which the first initialization scan signal transitions from an active level to an inactive level to a time point at which the first compensation scan signal transitions from the inactive level to the active level is less than one horizontal period.

2. The display device of claim 1, wherein the one horizontal period is a time from a time point at which the first compensation scan signal transitions from the inactive level to the active level to a time point at which the second compensation scan signal transitions from the inactive level to the active level.

3. The display device of claim 1, wherein the driving controller provides the scan driving circuit with a first start signal, a second start signal, a first clock signal, a second clock signal, a third clock signal, and a fourth clock signal.

4. The display device of claim 3, wherein the scan driving circuit outputs the first initialization scan signal in response to the first start signal, the first clock signal, and the second clock signal, and the scan driving circuit outputs the first compensation scan signal and the second compensation scan signal in response to the second start signal, the third clock signal, and the fourth clock signal.

5. The display device of claim 4, wherein the scan driving circuit includes:

an initialization stage which outputs the first initialization scan signal in response to the first start signal, the first clock signal, and the second clock signal;

a first compensation stage which outputs the first compensation scan signal in response to the second start signal, the third clock signal, and the fourth clock signal; and a second compensation stage which outputs the second compensation scan signal in response to the first compensation scan signal, the third clock signal, and the fourth clock signal.

6. The display device of claim 4, wherein a frequency of each of the third clock signal and the fourth clock signal is higher than a frequency of each of the first clock signal and the second clock signal.

7. The display device of claim 1, wherein the display panel further includes:

a third pixel connected to a third initialization scan line and a third compensation scan line; and a fourth pixel connected to a fourth initialization scan line and a fourth compensation scan line, and wherein the scan driving circuit provides a second initialization scan signal to the third initialization scan line and the fourth initialization scan line in common, and provides a third compensation scan signal and a fourth compensation scan signal to the third compensation scan line and the fourth compensation scan line, respectively.

8. The display device of claim 7, wherein a delay time from a time point at which 1 the first initialization scan signal transitions from the inactive level to the active level to a time point at which the second initialization scan signal transitions from the inactive level to the active level is two horizontal periods.

9. The display device of claim 1, wherein the display panel further includes a data line connected to the first pixel and the second pixel, and wherein the display device further comprises:

a data driving circuit which drives the data line.

10. The display device of claim 9, wherein the driving controller receives an input image signal, compensates for the input image signal corresponding to at least one selected from the first pixel and the second pixel based on a compensation value, and outputs an output image signal to the data driving circuit.

11. The display device of claim 10, wherein the compensation value includes a first compensation value corresponding to the first pixel and a second compensation value corresponding to the second pixel, wherein the driving controller compensates for the input image signal corresponding to the first pixel based on the first compensation value and outputs the output image signal to the data driving circuit, and wherein the driving controller compensates for the input image signal corresponding to the second pixel based on the second compensation value and outputs the output image signal to the data driving circuit.

12. A display device comprising:

a display panel including a first pixel connected to a first initialization scan line and a first compensation scan line, a second pixel connected to a second initialization scan line and a second compensation scan line, a third pixel connected to a third initialization scan line and a third compensation scan line, and a fourth pixel connected to a fourth initialization scan line and a fourth compensation scan line;

a scan driving circuit which provides a first initialization scan signal to the first initialization scan line and the second initialization scan line in common, provides a second initialization scan signal to the third initialization scan line and the fourth initialization scan line in common, and provides a first compensation scan signal, a second compensation scan signal, a third compensation scan signal, and a fourth compensation scan signal to the first compensation scan line, the second compensation scan line, the third compensation scan line, and the fourth compensation scan line, respectively; and a driving controller which controls the scan driving circuit, wherein a first time from a time point at which the first compensation scan signal transitions from an inactive level to an active level to a time point at which the second compensation scan signal transitions from the inactive level to the active level is less than a second time from a time point at which the second compensation scan signal transitions from the inactive level to the active level to a time point at which the third compensation scan signal transitions from the inactive level to the active level.

13. The display device of claim 12, wherein a third time from a time point at which the third compensation scan signal transitions from the inactive level to the active level to a time point at which the fourth compensation scan signal transitions from the inactive level to the active level is less than the second time.

14. The display device of claim 13, wherein the second time is one horizontal period, and each of the first time and the third time is less than the one horizontal period.

15. The display device of claim 14, wherein a delay time from a time point at which the first initialization scan signal transitions from the inactive level to the active level to a time point at which the second initialization scan signal transitions from the inactive level to the active level is two horizontal periods.

16. The display device of claim 12, wherein the driving controller provides the scan driving circuit with a first start signal, a second start signal, a first clock signal, a second clock signal, a third clock signal, and a fourth clock signal.

17. The display device of claim 16, wherein the scan driving circuit outputs the first initialization scan signal and the second initialization scan signal in response to the first start signal, the first clock signal, and the second clock signal, and the scan driving circuit outputs the first compensation scan signal, the second compensation scan signal, the third compensation scan signal, and the fourth compensation scan signal in response to the second start signal, the third clock signal, and the fourth clock signal.

18. The display device of claim 16, wherein the scan driving circuit includes:

a first initialization stage which outputs the first initialization scan signal in response to the first start signal, the first clock signal and the second clock signal; and a second initialization stage which outputs the second initialization scan signal in response to the first initialization scan signal, the first clock signal, and the second clock signal.

19. The display device of claim 16, wherein the scan driving circuit includes:

a first compensation stage which outputs the first compensation scan signal in response to the second start signal, the third clock signal, and the fourth clock signal;

a second compensation stage which outputs the second compensation scan signal in response to the first compensation scan signal, the third clock signal, and the fourth clock signal;

a third compensation stage which outputs the third compensation scan signal in response to the second compensation scan signal, the third clock signal, and the fourth clock signal; and a fourth compensation stage which outputs the fourth compensation scan signal in response to the third compensation scan signal, the third clock signal, and the fourth clock signal.

20. The display device of claim 16, wherein a frequency of each of the third clock signal and the fourth clock signal is higher than a frequency of each of the first clock signal and the second clock signal.

21. The display device of claim 12, wherein the display panel further includes a data line connected to the first pixel and the second pixel, and wherein the display device further comprises:

a data driving circuit which drives the data line.

22. The display device of claim 21, wherein the driving controller receives an input image signal, compensates for the input image signal corresponding to at least one selected from the first pixel and the second pixel based on a compensation value, and outputs an output image signal to the data driving circuit.

23. The display device of claim 22, wherein the compensation value includes a first compensation value corresponding to the first pixel and a second compensation value corresponding to the second pixel, wherein the driving controller compensates for the input image signal corresponding to the first pixel based on the first compensation value and outputs the output image signal to the data driving circuit, and wherein the driving controller compensates for the input image signal corresponding to the second pixel based on the second compensation value and outputs the output image signal to the data driving circuit.

24. A scan driving circuit comprising:

a first scan driving circuit which provides a first initialization scan signal to a first initialization scan line and a second initialization scan line; and a second scan driving circuit which provides a first compensation scan signal to a first compensation scan line and provides a second compensation scan signal to a second compensation scan line, wherein a delay time from a time point at which the first initialization scan signal transitions from an active level to an inactive level to a time point at which the first compensation scan signal transitions from the inactive level to the active level is less than one horizontal period.

25. The scan driving circuit of claim 24, wherein the one horizontal period is a time from a time point at which the first compensation scan signal transitions from the inactive level to the active level to a time point at which the second compensation scan signal transitions from the inactive level to the active level.

26. A driving controller comprising:

an image processor which outputs an output image signal in response to an input image signal and a control signal; and a control signal generator which outputs a data control signal and a scan control signal in response to the control signal, wherein the image processor outputs the output image signal for compensating for the input image signal by using a first compensation value when the input image signal corresponds to a first row of pixels, and wherein the image processor outputs the output image signal for compensating for the input image signal by using a second compensation value when the input image signal corresponds to a second row of pixels.

27. The driving controller of claim 26, wherein the scan control signal includes a start signal, and wherein the control signal generator adjusts a pulse width of the start signal in a way such that a delay time from a time point at which a first initialization scan signal provided to a first initialization scan line transitions from an active level to an inactive level to a time point at which a first compensation scan signal provided to a first compensation scan line transitions from the inactive level to the active level is less than one horizontal period.

28. The driving controller of claim 26, wherein the scan control signal includes a first clock signal and a second clock signal, and wherein the control signal generator outputs the first clock signal and the second clock signal in a way such that a delay time from a time point at which a first initialization scan signal provided to a first initialization scan line transitions from an active level to an inactive level to a time point at which a first compensation scan signal provided to a first compensation scan line transitions from the inactive level to the active level is less than one horizontal period.

* * * * *